(12) United States Patent
Nozu et al.

(10) Patent No.: US 10,415,659 B2
(45) Date of Patent: Sep. 17, 2019

(54) CLUTCH APPARATUS AND CONTROL METHOD FOR CLUTCH APPARATUS

(71) Applicant: JTEKT CORPORATION, Osaka-shi (JP)

(72) Inventors: Tomohiro Nozu, Anjo (JP); Akira Kodama, Chiryu (JP); Masaki Mita, Chiryu (JP); Shotaro Niimi, Kariya (JP)

(73) Assignee: JTEKT CORPORATION, Osaka-shi (JP)

(*) Notice: Subject to any disclaimer, the term of this patent is extended or adjusted under 35 U.S.C. 154(b) by 420 days.

(21) Appl. No.: 15/213,462

(22) Filed: Jul. 19, 2016

(65) Prior Publication Data

US 2017/0023075 A1    Jan. 26, 2017

(30) Foreign Application Priority Data

Jul. 24, 2015   (JP) .................................. 2015-146863
Sep. 17, 2015  (JP) .................................. 2015-184136

(51) Int. Cl.
*F16D 48/06* (2006.01)
*F16D 13/52* (2006.01)
(Continued)

(52) U.S. Cl.
CPC ............ *F16D 48/066* (2013.01); *B60K 17/02* (2013.01); *B60K 17/35* (2013.01);
(Continued)

(58) Field of Classification Search
CPC .................................................. F16D 48/066
(Continued)

(56) References Cited

U.S. PATENT DOCUMENTS 6,262,556 B1* 7/2001 Hubbard ............. F16H 61/0251
318/798
2004/0209718 A1* 10/2004 Ishibashi ............. B60W 10/103
474/18
(Continued)

FOREIGN PATENT DOCUMENTS

JP          2008-74240 A    4/2008
JP          2015-105696 A   6/2015
WO     WO 2014/125926 A1   8/2014

OTHER PUBLICATIONS

Japanese Office Action issued in Japanese Patent Application No. 2015-184136 on Jun. 25, 2019, citing references AO-AP therein (w/ English Translation).

*Primary Examiner* — Jacob S. Scott
*Assistant Examiner* — Michael E Butler
(74) *Attorney, Agent, or Firm* — Oblon, McClelland, Maier & Neustadt, L.L.P.

(57) ABSTRACT

A driving-force transmitting apparatus includes first and second friction clutches, a piston that presses the first and second friction clutches, a hydraulic pump that feeds hydraulic oil to a cylinder chamber in the piston, an electric motor that drives the hydraulic pump, and a control apparatus that controls the electric motor to adjust the discharge pressure of the hydraulic pump. The control apparatus has a feedback control apparatus that controls the electric motor using a correction value based on a deviation between a target value and an actual value of the discharge pressure of the hydraulic pump, a hydraulic-oil temperature estimating apparatus that estimates a temperature of hydraulic oil, and a gain adjusting apparatus that changes a correction amount for feedback control in accordance with the estimated temperature of the hydraulic oil.

11 Claims, 14 Drawing Sheets

(FIRST EMBODIMENT)

(51) Int. Cl.
*F16D 48/02* (2006.01)
*F16D 25/0638* (2006.01)
*B60K 17/02* (2006.01)
*B60K 17/35* (2006.01)
*B60K 23/08* (2006.01)
*F16D 11/14* (2006.01)
*F16D 11/00* (2006.01)
*F16D 121/04* (2012.01)

(52) U.S. Cl.
CPC ...... *B60K 17/3515* (2013.01); *B60K 23/0808* (2013.01); *F16D 13/52* (2013.01); *F16D 25/0638* (2013.01); *F16D 25/14* (2013.01); *F16D 48/02* (2013.01); *B60Y 2400/424* (2013.01); *F16D 11/14* (2013.01); *F16D 2011/002* (2013.01); *F16D 2048/0257* (2013.01); *F16D 2121/04* (2013.01); *F16D 2500/1045* (2013.01); *F16D 2500/10431* (2013.01); *F16D 2500/10462* (2013.01); *F16D 2500/1107* (2013.01); *F16D 2500/3022* (2013.01); *F16D 2500/3056* (2013.01); *F16D 2500/3168* (2013.01); *F16D 2500/502* (2013.01); *F16D 2500/7043* (2013.01); *F16D 2500/70406* (2013.01)

(58) Field of Classification Search
USPC .......................................................... 701/65
See application file for complete search history.

(56) References Cited

U.S. PATENT DOCUMENTS

| | | | |
|---|---|---|---|
| 2007/0080004 A1* | 4/2007 | Pfund | B60W 10/02 180/65.25 |
| 2009/0076694 A1* | 3/2009 | Tabata | B60K 6/365 701/58 |
| 2010/0125395 A1* | 5/2010 | Horii | F16H 61/32 701/51 |
| 2012/0115674 A1* | 5/2012 | Ikegami | B60K 6/36 477/3 |
| 2014/0354204 A1* | 12/2014 | Tachibana | H02P 6/08 318/473 |
| 2015/0369307 A1 | 12/2015 | Yoshino | |
| 2016/0352280 A1* | 12/2016 | Miyamoto | F16H 61/0025 |

* cited by examiner (FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(FIRST EMBODIMENT)

(SECOND EMBODIMENT)

FIG. 12 (SECOND EMBODIMENT)

(SECOND EMBODIMENT)

(SECOND EMBODIMENT)

(THIRD EMBODIMENT)

CLUTCH APPARATUS AND CONTROL METHOD FOR CLUTCH APPARATUS

INCORPORATION BY REFERENCE

The disclosure of Japanese Patent Application No. 2015-146863 filed on Jul. 24, 2015 and No. 2015-184136 filed on Sep. 17, 2015 including the specification, drawings and abstract, is incorporated herein by reference in its entirety.

BACKGROUND OF THE INVENTION

1. Field of the Invention

The invention relates to a clutch apparatus including a friction clutch that is subjected to a hydraulic pressing force to generate a friction force between friction members, and a method for controlling a clutch apparatus.

2. Description of the Related Art

A clutch apparatus including a friction clutch that is subjected to a hydraulic pressing force to generate a friction force between friction members is conventionally used for four-wheel drive vehicles that can be switched between a four-wheel driving state and a two-wheel driving state (for example, see International Publication No. 2014/125926 (WO 2014/125926 A), paragraphs [0003], [0029], and [0044] of the specification).

The four-wheel drive vehicle described in WO 2014/125926 A has a friction clutch in which a plurality of friction materials is stacked, an electric motor that is controlled by a control unit, a hydraulic pump that is driven by an electric motor, a piston that is subjected to a hydraulic pressure of hydraulic oil discharged from the hydraulic pump to press the friction clutch, and a housing provided with a piston chamber in which the piston is housed and into which hydraulic oil is fed. The friction clutch is arranged between a propeller shaft and a rear differential unit.

In the four-wheel drive vehicle, when no hydraulic oil is supplied to the friction clutch, a driving force of an engine is transmitted from a transmission only to a front wheel side via a front differential unit to set the vehicle in the two-wheel driving state. When the hydraulic pump is rotationally driven by the electric motor to feed the hydraulic oil into the piston chamber, the friction materials are pressed to generate a friction force, and a resultant torque is transmitted and distributed to a rear wheel side to set the vehicle in the four-wheel driving state.

The four-wheel drive vehicle described in WO 2014/125926 A is configured to measure or estimate the temperature of the hydraulic oil in order to prevent a situation where the hydraulic oil becomes more viscous while having low temperature, leading an excessive torque transmitted by the friction clutch.

The inventors have found that, when the viscosity of the hydraulic oil changes as a result of a change in the temperature of the hydraulic oil, controllability of the electric motor that drives the hydraulic pump is affected. In other words, an elevated temperature of the hydraulic oil reduces the viscosity of the hydraulic oil and thus a rotational resistance to the hydraulic pump, whereas a lowered temperature of the hydraulic oil increases the viscosity of the hydraulic oil and thus the rotational resistance to the hydraulic pump. Thus, when the electric motor is controlled in the same manner regardless of whether the hydraulic oil has low temperature or high temperature, a long time may be needed for a discharge pressure of the hydraulic pump to converge to a target value.

SUMMARY OF THE INVENTION

An object of the invention is to provide a clutch apparatus and a method for controlling a clutch apparatus that enable a pressure at which hydraulic oil is discharged from a hydraulic pump to be quickly made closer to a target pressure even when the temperature of the hydraulic oil changes.

A clutch apparatus according to an aspect of the invention includes: a friction clutch that is subjected to a pressing force to generate a friction force between friction members; a piston that is subjected to a hydraulic pressure to press the friction clutch; a hydraulic chamber in which the hydraulic pressure is allowed to act on the piston; a hydraulic pump that feeds hydraulic oil to the hydraulic chamber; an electric motor that drives the hydraulic pump; and a control apparatus that controls the electric motor to adjust a discharge pressure of the hydraulic pump. The control apparatus includes a feedback control apparatus that feedback-controls the electric motor using a correction value based on a deviation between a target value and an actual value of the discharge pressure of the hydraulic pump such that the discharge pressure of the hydraulic pump is equal to a target pressure, a hydraulic oil temperature estimating apparatus that estimates a temperature of the hydraulic oil based on a ratio between a current value of a motor current supplied to the electric motor and a rotation speed of the electric motor, and a correction amount adjusting apparatus that changes a correction amount provided by the feedback control in accordance with the estimated temperature of the hydraulic oil.

The clutch apparatus enables the pressure at which the hydraulic oil is discharged from the hydraulic pump to be quickly made closer to the target pressure even when the temperature of the hydraulic oil changes.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
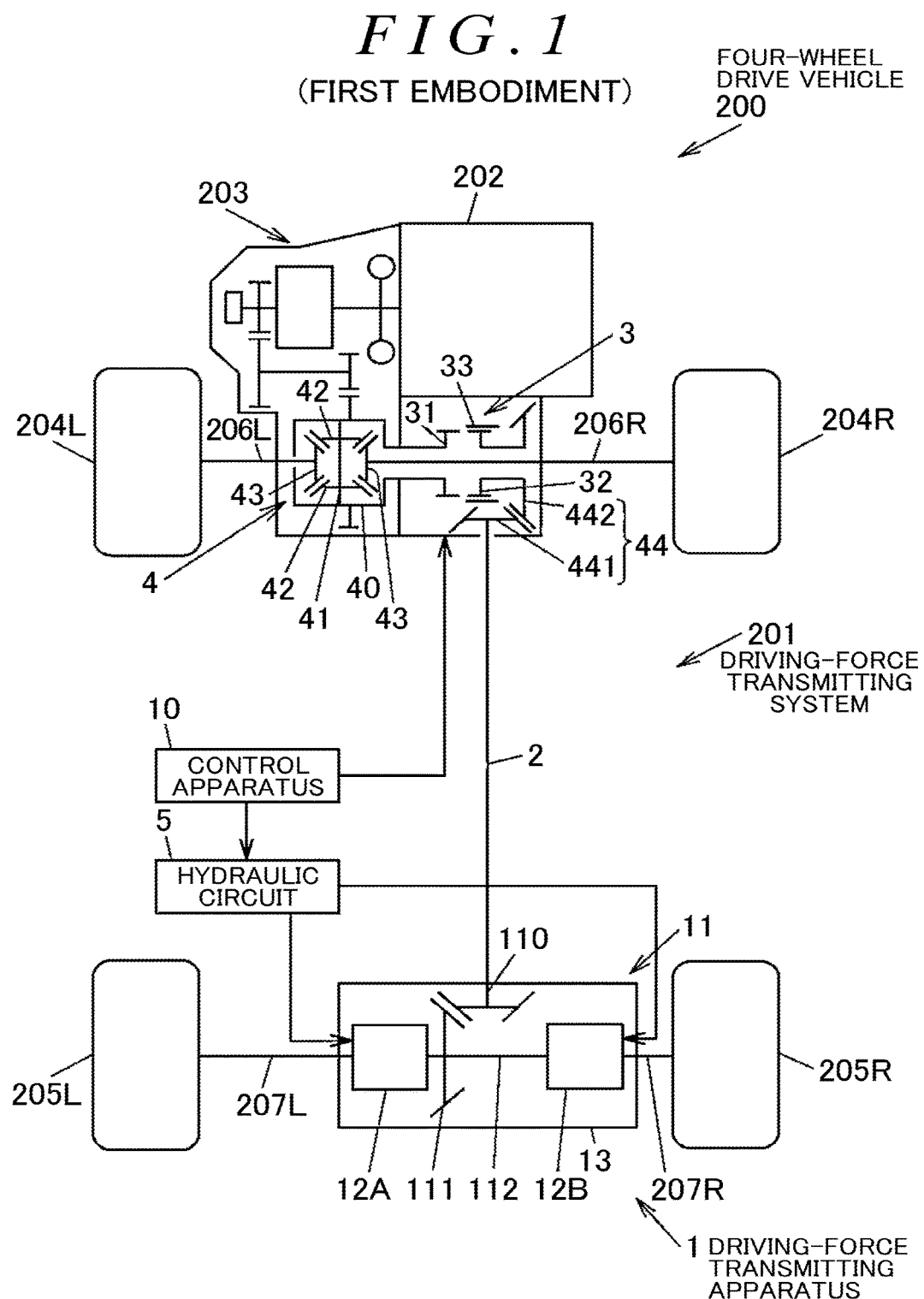
FIG. 1 is a diagram schematically depicting a configuration of a four-wheel drive vehicle including a clutch apparatus according to a first embodiment of the invention.

FIG. 1 is a diagram schematically depicting a configuration of a four-wheel drive vehicle including a driving-force transmitting apparatus serving as a clutch apparatus according to a first embodiment of the invention.

A four-wheel drive vehicle 200 includes an engine 202 serving as a driving source that generates a driving force for traveling, a transmission 203, front wheels 204R and 204L serving as a lateral pair of main driving wheels, rear wheels 205R and 205L serving as a lateral pair of auxiliary driving wheels, a driving-force transmitting system 201 that enables the driving force of the engine 202 to be transmitted to the front wheels 204R and 204L and the rear wheels 205R and 205L, and a control apparatus 10. In the present embodiment, R and L in reference characters are used to mean a right side and a left side with respect to a traveling direction of a vehicle.

The four-wheel drive vehicle 200 can be switched between a four-wheel driving state in which the driving force of the engine 202 is transmitted to the front wheels 204R and 204L and the rear wheels 205R and 205L and a two-wheel driving state in which the driving force of the engine 202 is transmitted only to the front wheels 204R and 204L. That is, the driving force of the engine 202 is transmitted to the front wheels 204R and 204L, serving as main driving wheels, both in the two-wheel driving state and in the four-wheel driving state. The driving force of the engine 202 is transmitted to the rear wheels 205R and 205L, serving as auxiliary driving wheels, only in the four-wheel driving state.

In the present embodiment, an engine that is an internal combustion engine is adopted as a driving source. However, the invention is not limited to this. The driving source may be configured using a combination of the engine and a high-power electric motor such as an interior permanent magnet synchronous (IPM) motor or using only the high-power electric motor.

The driving-force transmitting system 201 is arranged in a driving-force transmission path extending from the transmission 203 to the rear wheels 205R and 205L in the four-wheel drive vehicle 200, and is mounted in a body (not depicted in the drawings) of the four-wheel drive vehicle 200.

The driving-force transmitting system 201 further has a driving-force transmitting apparatus 1, a propeller shaft 2, a driving-force transmission switching apparatus 3, a front differential 4, and gear mechanisms 44 and 11. The driving-force transmitting system 201 is configured to switch the four-wheel drive vehicle 200 from the four-wheel driving state to the two-wheel driving state thereof and from the two-wheel driving state to the four-wheel driving state. The driving-force transmitting apparatus 1 is an aspect of a clutch apparatus in the invention.

The front differential 4 has a front differential case 40, a pinion shaft 41 that rotates integrally with the front differential case 40, a pair of pinion gears 42 that are pivotally supported by the pinion shaft 41, and a pair of side gears 43 that meshes with the pinion gears 42 such that a gear shaft of the side gears 43 is orthogonal to a gear shaft of the pinion gears 42. The front differential 4 is arranged between the transmission 203 and the driving-force transmission switching apparatus 3. A first side gear 43 of the pair of side gears 43 is coupled to a front-wheel axle shaft 206L. A second side gear 43 is coupled to a front-wheel axle shaft 206R.

The engine 202 outputs the driving force to the front-wheel axle shafts 206R and 206L via the transmission 203 and the front differential 4 to drive the front wheels 204R and 204L. The engine 202 also outputs the driving force to rear-wheel axle shafts 207R and 207L via the transmission 203, the driving-force transmission switching apparatus 3, the propeller shaft 2, and the driving-force transmitting apparatus 1 to drive the rear wheels 205R and 205L. The propeller shaft 2 is arranged between the driving-force transmitting apparatus 1 and the driving-force transmission switching apparatus 3 to transmit the driving force in a front-rear direction of the four-wheel drive vehicle 200.

At a front-wheel end of the propeller shaft 2, the front-wheel gear mechanism 44 is arranged which includes a drive pinion 441 and a ring gear 442 that mesh with each other. The drive pinion 441 is coupled to a front end of the propeller shaft 2, and the ring gear 442 meshes with the drive pinion 441 such that a gear shaft of the ring gear 442 is orthogonal to the drive pinion 441.

Figure 2A:
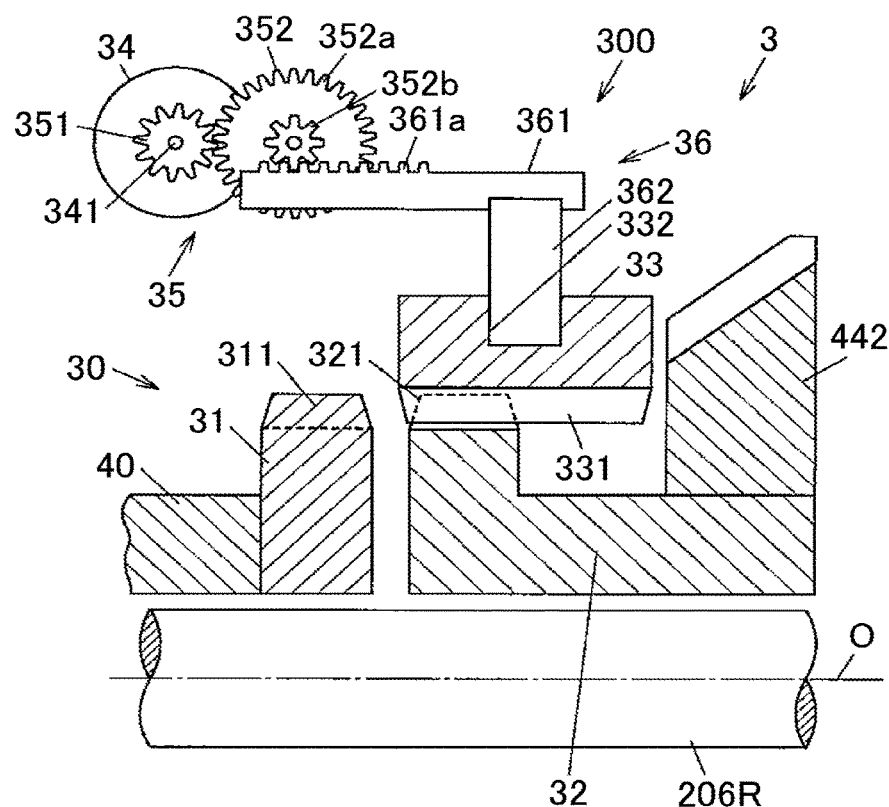
FIG. 2A is a sectional view of a driving-force transmission switching apparatus.
Figure 2B:
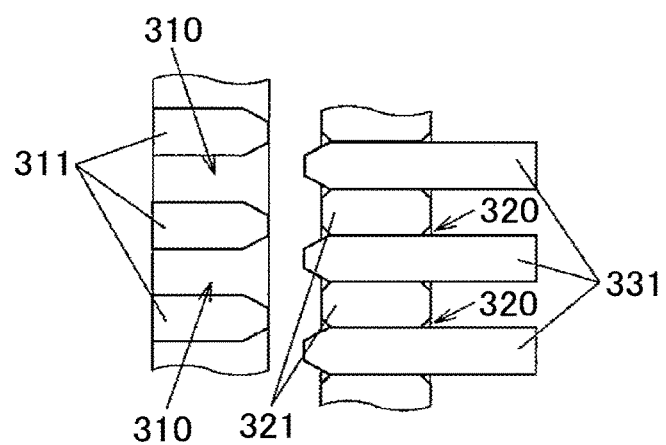
FIG. 2B is a diagram schematically depicting a meshing portion of the driving-force transmission switching apparatus.

FIGS. 2A and 2B depict a configuration example of the driving-force transmission switching apparatus 3. FIG. 2A is a sectional view of the driving-force transmission switching apparatus 3. FIG. 2B is a diagram schematically illustrating a meshing portion of the driving-force transmission switching apparatus 3. FIG. 2A depicts an upper half portion of the driving-force transmission switching apparatus 3 that is located above an axis of rotation O of the front differential case 40.

The driving-force transmission switching apparatus 3 includes a dog clutch 30 including a first to third rotating members 31 to 33 that rotate coaxially with the front differential case 40 and an actuator 300 that actuates the dog clutch 30. The actuator 300 includes an electric motor 34, a reduction mechanism 35 that reduces the speed of rotation transmitted from an output shaft 341 of the electric motor 34, and a moving mechanism 36 that moves the third rotating member 33 of the dog clutch 30 in an axial direction based on a torque resulting from the speed reduction, by the reduction mechanism 35, of rotation transmitted from the electric motor 34. The electric motor 34 is operated by a current fed from the control apparatus 10. The actuator 300 is controlled by the control apparatus 10.

The first rotating member 31 of the dog clutch 30 is fixed to an end of the front differential case 40 in the axial direction. The second rotating member 32 is fixed to the ring gear 442 of the gear mechanism 44.

The third rotating member 33 can move in the axial direction with respect to the first rotating member 31 and the second rotating member 32.

The first rotating member 31 is annular such that the right-front-wheel axle shaft 206R is inserted through an inner peripheral side of the first rotating member 31. The first rotating member 31 has a plurality of spline teeth 311 formed on an outer peripheral surface of the first rotating member 31 so as to extend parallel to the axis of rotation O of the front differential case 40. Recessed portions 310 are each formed between every two circumferentially adjacent spline teeth 311 of the plurality of spline teeth 311. The second rotating member 32 is cylindrically shaped such that the right front axle shaft 206R is inserted through the second rotating member 32. The second rotating member 32 can be rotated coaxially with and relative to the first rotating member 31. The second rotating member 32 has a plurality of spline teeth 321 formed on an outer peripheral surface of the second rotating member 32 so as to extend parallel to the axis of rotation O of the front differential case 40. Recessed portions 320 are each formed between every two circumferentially adjacent spline teeth 321 of the plurality of spline teeth 321.

The third rotating member 33 is a sleeve-like coupling member arranged on an outer peripheral side of the first rotating member 31 and the second rotating member 32. On an inner peripheral surface of the third rotating member 33, a plurality of spline teeth 331 is formed which can be engaged with the spline teeth 311 of the first rotating member 31 and the spline teeth 321 of the second rotating member 32.

In the present embodiment, the third rotating member 33 constantly meshes with the second rotating member 32 and can move in the axial direction with respect to the second rotating member 32. More specifically, the spline teeth 331 of the third rotating member 33 mesh with the recessed portions 320 of the second rotating member 32, and with the spline teeth 331 remaining meshed with the recessed portions 320, the third rotating member 33 can move in the axial direction with respect to the second rotating member 32.

When the third rotating member 33 is moved to the first rotating member 31 by the moving mechanism 36, the spline teeth 331 of the third rotating member 33 mesh with the recessed portions 310 of the first rotating member 31 to couple the first rotating member 31 and the third rotating member 33 together so that the first and third rotating member 31 and 33 are non-rotatable relative to each other. Consequently, the first rotating member 31 and the second rotating member 32 are coupled together via the third rotating member 33 so as to be non-rotatable relative to each other such that the driving force can be transmitted from the first rotating member 31 to the second rotating member 32. When the third rotating member 33 is separated from the first rotating member 31, the meshing engagement between the spline teeth 331 of the third rotating member 33 and the recessed portions 310 of the first rotating member 31 is released so that the first rotating member 31 and the second rotating member 32 are rotatable relative to each other. Thus, transmission of the driving force from the first rotating member 31 to the second rotating member 32 is cut off.

The reduction mechanism 35 has a pinion gear 351 that rotates integrally with the output shaft 341 of the electric motor 34, and a reduction gear 352 having a large-diameter gear portion 352a that meshes with the pinion gear 351 and a small-diameter gear portion 352b that rotates integrally with the large-diameter gear portion 352a. The moving mechanism 36 has a linear motion shaft 361 with rack teeth 361a that mesh with the small-diameter gear portion 352b of the reduction gear 352, and a shifting fork 362 fixed to the linear motion shaft 361. The third rotating member 33 has a ring-like annular groove 332 formed on an outer peripheral surface of the third rotating member 33 and in which the shifting fork 362 is fitted.

When the output shaft 341 of the electric motor 34 rotates, the speed of the rotation transmitted from the electric motor 34 is reduced by the reduction mechanism 35 to allow the linear motion shaft 361 to move parallel to the axis of rotation O of the front differential case 40. In conjunction with the movement of the linear motion shaft 361, the third rotating member 33 moves between a coupling portion where the third rotating member 33 meshes with the first rotating member 31 and the second rotating member 32 and an uncoupling position where the third rotating member 33 meshes with the second rotating member 32, while not meshing with the first rotating member 31.

As depicted in FIG. 1, the driving-force transmitting apparatus 1 has the rear-wheel gear mechanism 11 to which the driving force is transmitted from the propeller shaft 2, a first friction clutch 12A and a second friction clutch 12B that adjust the driving force transmitted via the gear mechanism 11 and that transmit the adjusted driving force to the axle shafts 207L and 207R, a housing 13 in which the first and second friction clutches 12A and 12B and the gear mechanism 11 are housed, a hydraulic circuit 5 that applies a hydraulic pressure to the first and second friction clutches 12A and 12B, and the control apparatus 10 that controls the hydraulic circuit 5.

The gear mechanism 11 includes a pinion gear 110 and a ring gear 111 that mesh with each other with gear shafts of the pinion gear 110 and a ring gear 111 orthogonal to each other and a center shaft 112 that rotates integrally with the ring gear 111. The center shaft 112 has an axis of rotation parallel to a vehicle width direction and is rotated by a turning force of the propeller shaft 2 received via the ring gear 111. The first friction clutch 12A is arranged between the center shaft 112 and the rear-wheel axle shaft 207L. The second friction clutch 12B is arranged between the center shaft 112 and the rear-wheel axle shaft 207R.

In the two-wheel driving state of the four-wheel drive vehicle 200 configured as described above, the driving-force transmission switching apparatus 3 cuts off transmission of the driving force from the engine 202 to the propeller shaft 2, and the driving-force transmitting apparatus 1 cuts off transmission of the turning force from the rear wheels 205R and 205L to the propeller shaft 2. Consequently, even while the four-wheel drive vehicle 200 is traveling, rotation of the propeller shaft 2 is stopped. This reduces, for example, stirring resistance to hydraulic oil in the front-wheel gear mechanism 44 and the rear-wheel gear mechanism 11, improving fuel consumption performance.

When the four-wheel drive vehicle 200 is switched from the two-wheel driving state to the four-wheel driving state, the turning force of the rear wheels 205R and 205L is transmitted to the propeller shaft 2 via the driving-force transmitting apparatus 1 to rotate the propeller shaft 2. Then, after rotational synchronization of the dog clutch 30 is completed, the driving-force transmission switching apparatus 3 is set to an active state (a state in which torque transmission is enabled). Thus, the four-wheel drive vehicle 200 is set to the four-wheel driving state.

Figure 3:
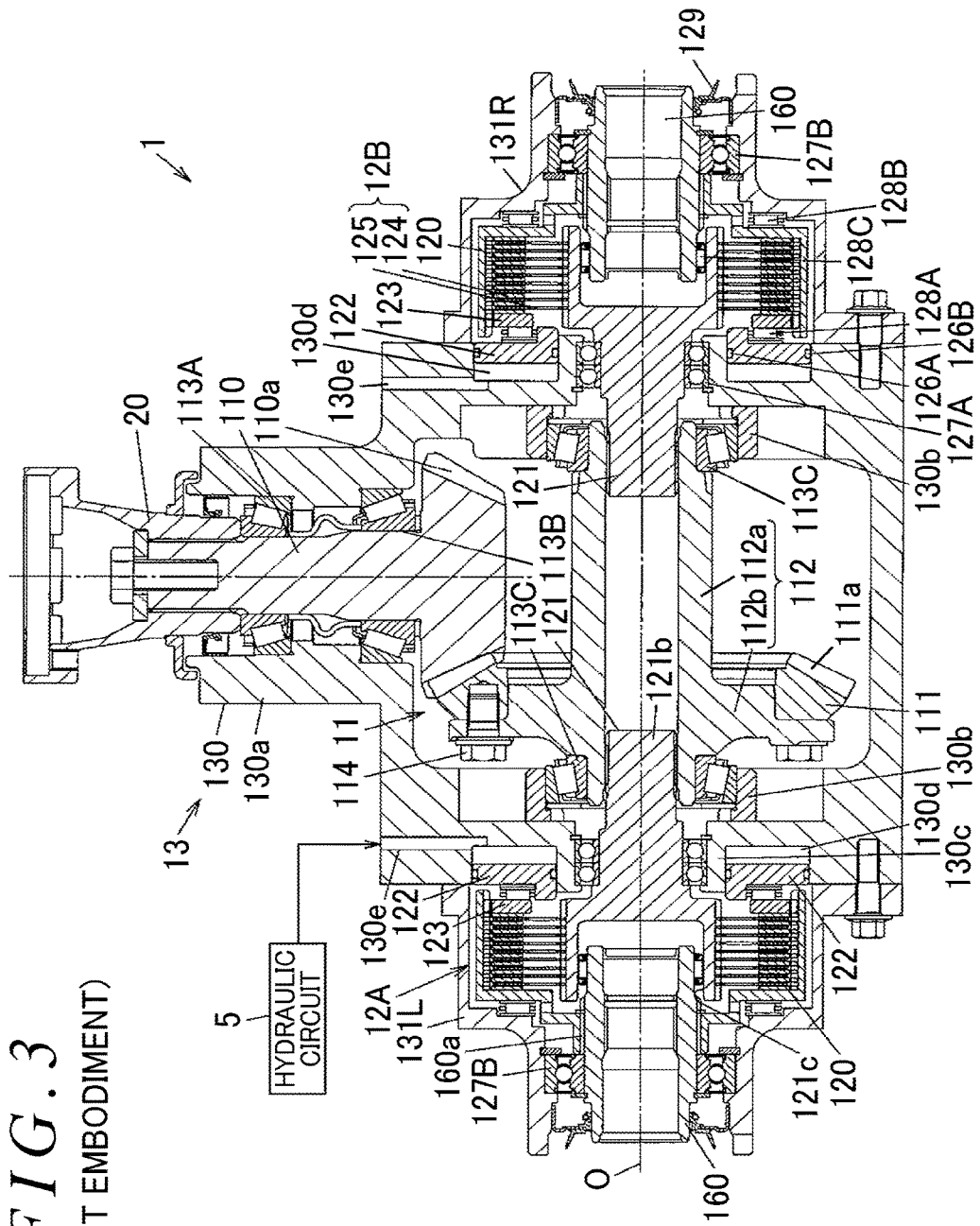
FIG. 3 is a sectional view of a specific example of the structure of a driving-force transmitting apparatus.
Figure 4:
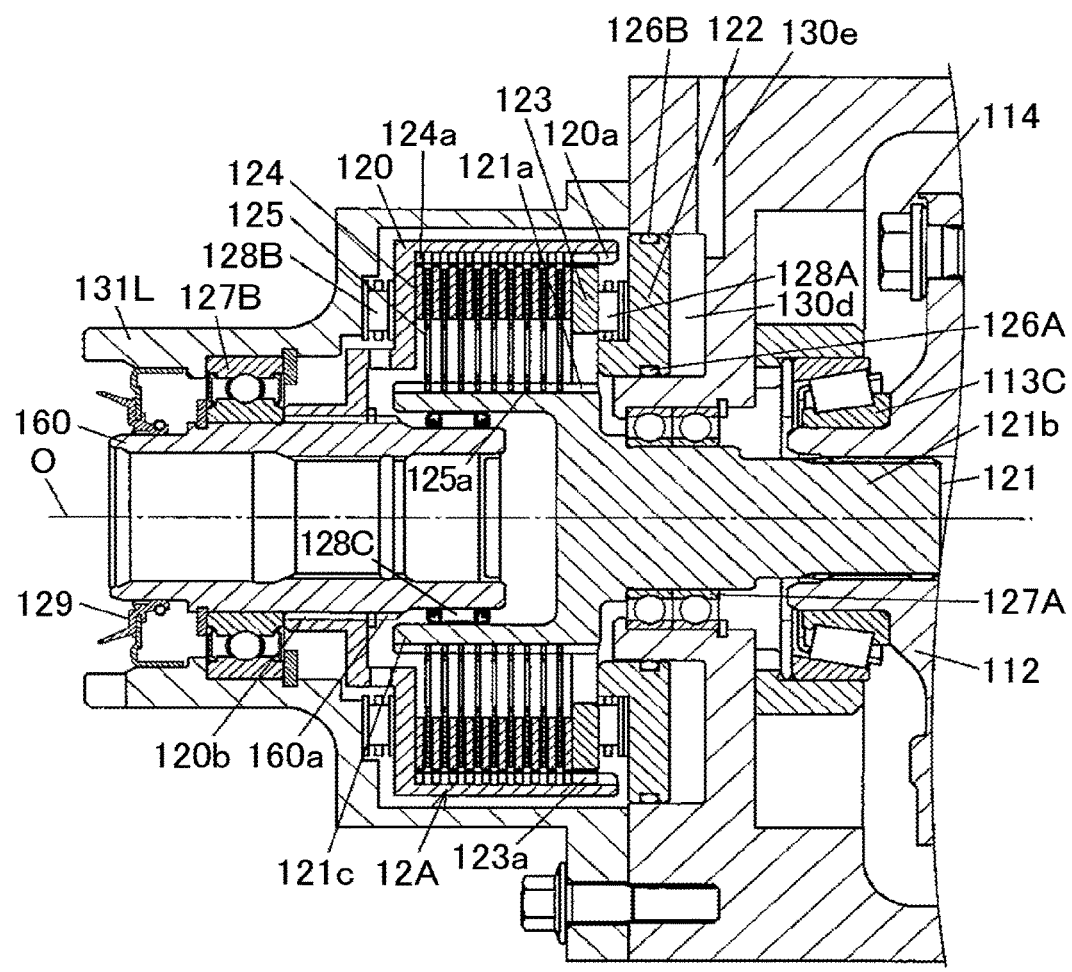
FIG. 4 is a sectional view of an important part of the driving-force transmitting apparatus depicting a first friction clutch and peripheral components.

FIG. 3 is a sectional view depicting a specific example of the structure of the driving-force transmitting apparatus 1. FIG. 4 is a sectional view of an important part of the driving-force transmitting apparatus 1 depicting the first friction clutch 12A and peripheral components.

As depicted in FIG. 3, the driving-force transmitting apparatus 1 has the above-described gear mechanism 11, first and second friction clutches 12A and 12B, and housing 13. The pinion gear 110 of the gear mechanism 11 is coupled to the propeller shaft 2 via an intermediate shaft 20. The driving-force transmitting apparatus 1 has a lateral pair of clutch housings 120 in which the first and second friction clutches 12A and 12B are respectively housed, a lateral pair of inner shafts 121 each supported coaxially with the corresponding clutch housing 120 so as to be rotatable relative to the clutch housing 120, and a lateral pair of coupling shafts 160 each of which allows the corresponding clutch housing 120 to be coupled to the corresponding one of the rear-wheel axle shafts 207R and 207L such that the corresponding clutch housing 120 and the corresponding rear-wheel axle shaft are non-rotatable relative to each other.

The housing 13 includes a center housing member 130 that houses the pinion gear 110, the ring gear 111, and the center shaft 112 of the gear mechanism 11, and side housing members 131L and 131R that house the first and second friction clutches 12A and 12B, respectively. The center housing member 130 is arranged between the side housing member 131R arranged on a right side in the vehicle width direction and the side housing member 131L arranged on a left side in the vehicle width direction. The center housing member 130 and each of the side housing members 131R and 131L are fastened together with bolts to be fixed to each other. Hydraulic oil not depicted in the drawings is sealed inside the housing 13 to lubricate meshing portion of the gears of the gear mechanism 11 and to lubricate frictionally sliding portion of the first and second friction clutches 12A and 12B.

The center housing member 130 includes a first holding portion 130a that holds the pinion gear 110 of the gear mechanism 11 via tapered roller bearings 113A and 113B so that the pinion gear 110 is rotatable, a second holding portion 130b that holds the center shaft 112 of the gear mechanism 11 via tapered roller bearings 113C so that the center shaft 112 is rotatable, a third holding portion 130e that holds a lateral pair of inner shafts 121 via respective ball bearings 127A so that the inner shafts 121 are rotatable, and cylinder chambers 130d in each of which a piston 122 described below is housed so as to be movable forward and rearward. The cylinder chambers 130d are formed at opposite ends of the center housing member 130 in the vehicle width direction and are open toward the side housing members 131R and 131L, respectively.

The center shaft 112 integrally has a cylindrical portion 112a shaped like a cylinder and extending along the axis of rotation O and a flange portion 112b formed to protrude outward from an end of the cylindrical portion 112a in a radial direction. On the ring gear 111, a plurality of meshing teeth 111a is formed which meshes with a gear portion 110a of the pinion gear 110. The ring gear 111 is fixed to the flange portion 112b of the center shaft 112 using bolts 114.

Each of the first and second friction clutches 12A and 12B has a plurality of outer clutch plates 124 that engages with the corresponding clutch housing 120 so as to be axially movable and non-rotatable relative to the clutch housing 120 and a plurality of inner clutch plates 125 that engages with the inner shaft 121 so as to be axially movable and non-rotatable relative to the corresponding inner shaft 121. The outer clutch plates 124 and the inner clutch plates 125 are alternately arranged in a direction parallel to the axis of rotation O and are pressed by the piston 122. That is, the first and second friction clutches 12A and 12B are subjected to a pressing force from the piston 122 to generate a friction force between the set of the outer clutch plates 124 and the set of the inner clutch plates 125. The outer clutch plates 124 and the inner clutch plates 125 are an aspect of a friction member in the invention.

The piston 122 is subjected, in the cylinder chamber 130d of the center housing member 130, to a hydraulic pressure of hydraulic oil fed from the hydraulic circuit 5, to press the outer clutch plates 124 and the inner clutch plates 125. The cylinder chamber 130d functions as a hydraulic chamber in which the hydraulic pressure of the hydraulic oil is allowed to act on the piston 122. The center housing member 130 is provided with a supply channel 130e through which the hydraulic oil fed from the hydraulic circuit 5 is guided to the cylinder chamber 130d. Seal members 126A and 126B are arranged on an inner peripheral surface and an outer peripheral surface, respectively, of the piston 122.

The first and second friction clutches 12A and 12B are each subjected, via the corresponding needle roller bearing 128A and pressing member 123, to a moving force of the piston 122 having come under the pressure of the hydraulic oil, to bring the outer clutch plates 124 into frictional contact with the inner clutch plates 125. Consequently, the turning force is transmitted between each of the inner shafts 121 and the corresponding clutch housing 120. That is, the first and second friction clutches 12A and 12B are each subjected to a pressing force from the corresponding pressing member 123 to generate a frictional force between the set of the outer clutch plates 124 and the set of the inner clutch plates 125. Consequently, the driving force of the engine 202 is transmitted to the rear wheels 205R and 205L via the second and first friction clutches 12B and 12A, respectively.

In the first and second friction clutches 12A and 12B, the outer clutch plates 124 and the inner clutch plates 125 are rotatable relative to one another while the piston 122 is not subjected to the pressure of the hydraulic oil. Thus, the first and second friction clutches 12A and 12B enable transmission of the driving force from the engine 202 to the rear wheels 205R and 205L to be cut off.

As depicted in FIG. 4, on an outer peripheral portion of each of the outer clutch plates 124, spline protrusions 124a are provided which engage with a straight spline fitting portion 120a formed on an inner peripheral surface of the corresponding clutch housing 120. On an inner peripheral portion of each of the inner clutch plates 125, spline protrusions 125a are provided which engage with a straight spline fitting portion 121a formed on an outer peripheral surface of the corresponding inner shaft 121.

Each of the pressing members 123 is formed of a circular-arc-shaped plate member and has, on its outer peripheral portion, spline protrusions 123a that engage with the straight spline fitting portion 120a of the corresponding clutch housing 120. The spline protrusions 123a are engaged with the straight spline fitting portion 120a so that the pressing member 123 is coupled to the corresponding clutch housing 120 so as to be axially movable and non-rotatable relative to the clutch housing 120. The pressing member 123 faces the piston 122 via the corresponding needle roller bearing 128A.

Each of the clutch housings 120 is provided with a spline fitting portion 120b that is spline-fitted on a spline fitting portion 160a formed on an outer peripheral surface of the corresponding coupling shaft 160. Consequently, the clutch housing 120 is coupled to the coupling shaft 160 so as to be non-rotatable relative to the coupling shaft 160. The clutch housing 120 is rotatably supported by the corresponding one of the side housing members 131R and 131L via the needle roller bearing 128B.

Each of the inner shafts 121 has a columnar shaft portion 121b and a cylindrical portion 121c that houses an end of the corresponding coupling shaft 160. A tip of the shaft portion 121b is coupled to the center shaft 112 by spline fitting so as to be non-rotatable relative to the center shaft 112. A needle roller bearing 128C is arranged between an inner peripheral surface of the cylindrical portion 121c and the outer peripheral surface of the coupling shaft 160. A ball bearing 127B and a seal member 129 are arranged between the outer peripheral surface of the coupling shaft 160 and an opening inner surface at an end of the corresponding one of the side housing members 131R and 131L in the vehicle width direction.

Figure 5:
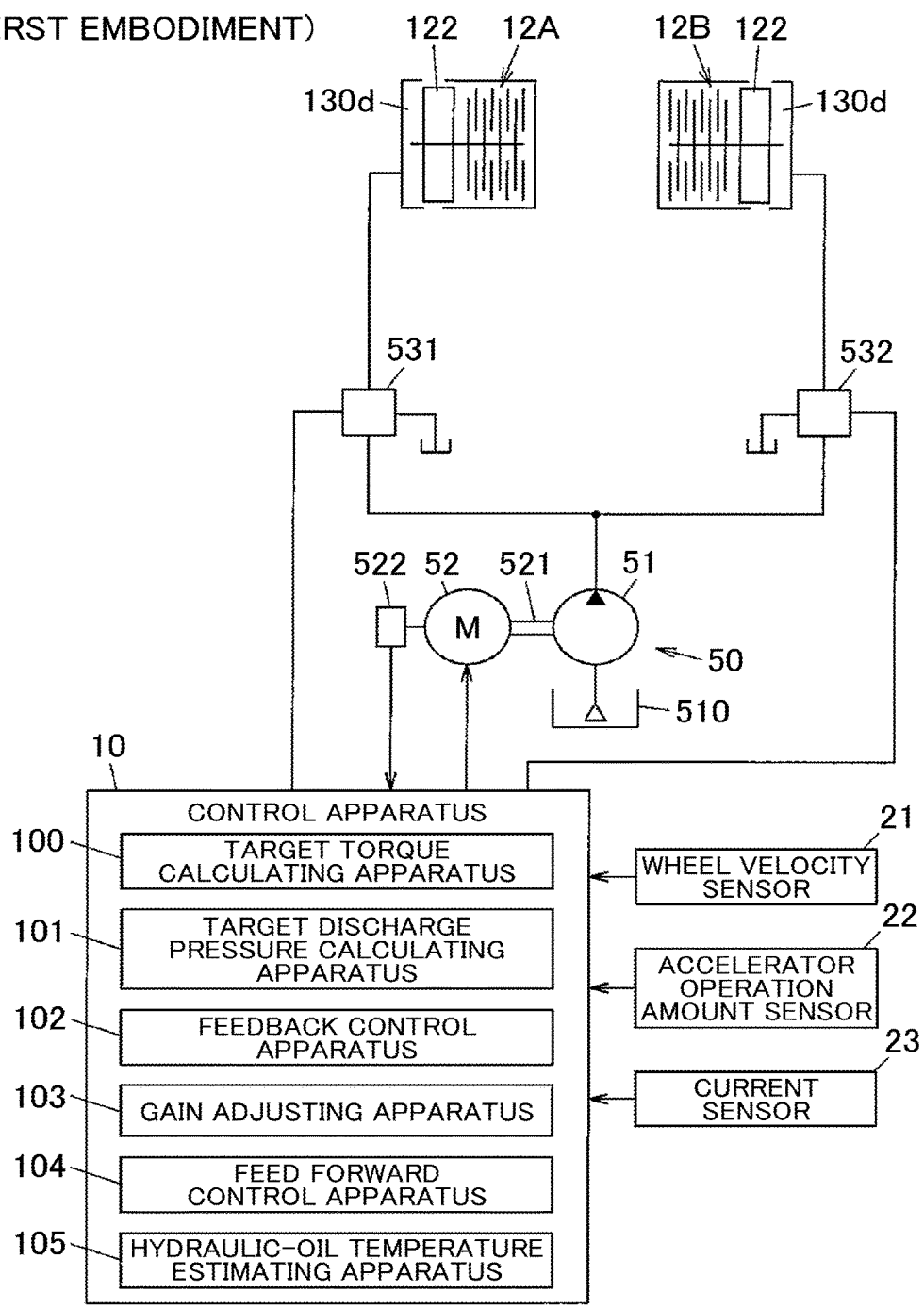
FIG. 5 is a diagram schematically depicting a configuration example of a hydraulic circuit along with a control apparatus that controls the hydraulic circuit.

FIG. 5 is a diagram schematically depicting a configuration example of the hydraulic circuit 5 along with the control apparatus 10, which controls the hydraulic circuit 5. The hydraulic circuit 5 has, as a hydraulic source 50, a hydraulic pump 51 and an electric motor 52 that drives the hydraulic pump 51. The control apparatus 10 controls the electric motor 52 to adjust a discharge pressure of the hydraulic pump 51. The electric motor 52 and the hydraulic pump 51 are coupled together via a shaft 521. The shaft 521 rotates integrally with a rotator of the electric motor 52. Between the shaft 521 and the rotator of the electric motor 52, a reduction gear may be provided which reduces the speed of rotation transmitted from the rotator in a predetermined reduction ratio.

The electric motor 52 is provided with an encoder 522 that allows detection of an angular position of the rotator with respect to a stator of the electric motor 52. The electric motor 52 is, for example, a DC brushless motor. However, a DC motor with a brush may be used as the electric motor 52. The encoder 522 outputs a plurality of pulse signals during one rotation of the rotator of the electric motor 52.

The hydraulic pump 51 itself is well known and discharges hydraulic oil pumped up from a reservoir, at a discharge pressure corresponding to the rotation speed of the electric motor 52. The discharge pressure of the hydraulic pump 51 increases in tandem with and proportion to the rotation speed of the electric motor 52. At a constant rotation speed of the electric motor 52, the discharge pressure of the hydraulic pump 51 increases with decreasing temperature of the hydraulic oil and increases in tandem with the viscosity of the hydraulic oil. As the hydraulic pump 51, specifically, an external gear pump or an internal gear pump, or a vane pump, may be used. The control apparatus 10 stores characteristics information indicative of relationship between the rotation speed of the electric motor 52 and the temperature of the hydraulic oil and the discharge pressure of the hydraulic pump 51.

The hydraulic circuit 5 also has a first pressure control valve 531 and a second pressure control valve 532. The first pressure control valve 531 is arranged in an oil path extending from the hydraulic pump 51 to the first friction clutch 12A to adjust the hydraulic pressure of the hydraulic oil fed to the cylinder chamber 130d in the first friction clutch 12A. The second pressure control valve 532 is arranged in an oil path extending from the hydraulic pump 51 to the second friction clutch 12B to adjust the hydraulic pressure of the hydraulic oil fed to the cylinder chamber 130d in the second friction clutch 12B.

When the pressure of the hydraulic oil discharged from the hydraulic pump 51 is higher than a set pressure corresponding to a current supplied by the control apparatus 10, each of the first and second pressure control valves 531 and 532 discharges a portion of the hydraulic oil to reduce the pressure of the hydraulic oil down to the set pressure and output the resultant hydraulic oil. The control apparatus 10 controls the electric motor 52 such that the discharge pressure of the hydraulic pump 51 is slightly higher than the hydraulic pressure of the hydraulic oil to be supplied to each of the cylinder chambers 130d corresponding to the friction clutches 12A and 12B. The control apparatus 10 controls the first and second pressure control valves 531 and 532 such that the hydraulic oil with a pressure resulting from reduction of the discharge pressure of the hydraulic pump 51 is fed to the cylinder chambers 130d corresponding to the first and second friction clutches 12A and 12B.

The control apparatus 10 includes: a target torque calculating apparatus 100 that calculates a target value of a transmitted torque (driving force) to be transmitted from the inner shafts 121 to the clutch housings 120 by the first and second friction clutches 12A and 12B; a target discharge pressure calculating apparatus 101 that calculates a target value of the discharge pressure of the hydraulic pump 51 based on the target value of the transmitted torque calculated by the target torque calculating apparatus 100; a feedback control apparatus 102 that feedback-controls the electric motor 52 so as to make the discharge pressure of the hydraulic pump 51 closer to the target value calculated by the target discharge pressure calculating apparatus 101; a gain adjusting apparatus 103 that adjusts a gain used for the feedback control performed by the feedback control apparatus 102; a feed forward control apparatus 104 that calculates a feed forward control amount for the electric motor 52 based on the target value of the transmitted torque calculated by the target torque calculating apparatus 100 and the temperature of the hydraulic oil; and a hydraulic-oil temperature estimating apparatus 105 that estimates a ratio between a current (motor current) supplied to the electric motor 52 and the rotation speed of the electric motor 52.

The target torque calculating apparatus 100 calculates the target value of the transmitted torque to be transmitted by the first and second friction clutches 12A and 12B based on detection values from a wheel velocity sensor 21 that detects rotation speeds of front wheels 204R and 204L and the rear wheels 205R and 205L and a detection value from an accelerator operation amount sensor 22 that detects an amount by which a driver has pressed on an accelerator pedal. The control apparatus 10 can acquire detection values from the wheel velocity sensor 21 and the accelerator operation amount sensor 22 through an in-vehicle communication network, for example, a controller area network (CAN).

The target discharge pressure calculating apparatus 101 sets the target value of the discharge pressure of the hydraulic pump 51 based on the target value of the transmitted torque set by the target torque calculating apparatus 100, with the temperature of the hydraulic oil estimated by the hydraulic-oil temperature estimating apparatus 105 taken into account.

The feedback control apparatus 102 feedback-controls the electric motor 52 using a correction value based on a deviation between the target value and the actual value of the discharge pressure of the hydraulic pump 51 such that the discharge pressure of the hydraulic pump 51 is equal to the target value set by the target discharge pressure calculating apparatus 101. In the present embodiment, the electric motor 52 is feedback-controlled such that the rotation speed of the electric motor 52 has a value corresponding to the target value of the discharge pressure set by the target discharge pressure calculating apparatus 101. Specifically, a voltage applied to the electric motor 52 is adjusted by the feedback control. Since the discharge pressure of the hydraulic pump 51 is proportional to the rotation speed of the electric motor 52 as described above, the deviation between the target value and the actual value of the discharge pressure of the hydraulic pump 51 can be determined based on a difference between a target value of the rotation speed of the electric motor 52 and the actual value of the rotation speed.

The gain adjusting apparatus 103 is an aspect of a correction amount adjusting apparatus that adjusts the gain in accordance with the temperature of the hydraulic oil to change the correction amount provided by the feedback control apparatus 102. The correction amount as used herein refers to the absolute value (magnitude) of a correction value. The gain adjusting apparatus 103 changes the correction amount such that the correction amount for feedback control decreases with increasing temperature of the hydraulic oil, in other words, decreases in tandem with viscosity of the hydraulic oil. Specifically, the gain used for the feedback control is reduced with increasing temperature of the hydraulic oil and is reduced in tandem with viscosity of the hydraulic oil.

In the present embodiment, the discharge pressure of the hydraulic pump 51 is determined based on the rotation speed of the electric motor 52. However, a hydraulic-pressure sensor that detects the discharge pressure of the hydraulic pump 51 may be provided, and the electric motor 52 may be feedback-controlled such that the detection value from the hydraulic-pressure sensor is equal to the target value of the discharge pressure of the hydraulic pump 51 set by the target discharge pressure calculating apparatus 101. In this case, the deviation between the target value and the actual value of the discharge pressure of the hydraulic pump 51 can be directly obtained.

The feed forward control apparatus 104 calculates, as a feed forward control amount, a voltage to be applied to the electric motor 52. A voltage (12 V) of a battery mounted in the four-wheel drive vehicle 200 is PWM-modulated and the resultant voltage is applied to the electric motor 52. During a predetermined period, an effective value fluctuates in accordance with a duty ratio corresponding to the voltage to be applied to the electric motor 52.

Table 1 partially illustrates a relationship between the voltage (V) calculated by the feed forward control apparatus 104 and the target value of the transmitted torque calculated by the target torque calculating apparatus 100 and the temperature of the hydraulic oil.

TABLE 1

|  | Temperature of hydraulic oil (degree-Celcius) | | |
| --- | --- | --- | --- |
|  | −20 | ... | 80 |
| Target value of transmitted torque (N · m) | 0 | ... | 0 |
|  | . | . | . |
|  | . | . | . |
|  | . | . | . |
|  | 500 | 3 | ... | 6 |
|  | . | . | . |
|  | . | . | . |
|  | . | . | . |
|  | 1000 | 6 | ... | 12 |

The hydraulic-oil temperature estimating apparatus 105 estimates the temperature of the hydraulic oil utilizing the fact that the ratio between the motor current supplied to the electric motor 52 and the rotation speed of the electric motor 52 changes in accordance with the temperature of the hydraulic oil. The control apparatus 10 can reference an output signal from a current sensor 23 that measures the motor current supplied to the electric motor 52. The current sensor 23, for example, measures a potential difference across a shunt resistor arranged in a current supply path to the electric motor 52 and outputs the measured potential difference.

Figure 6:
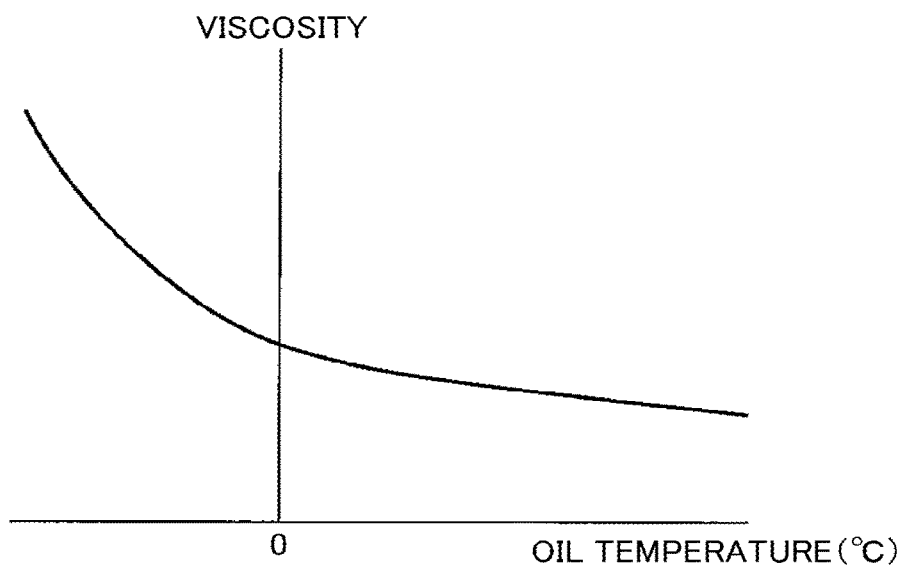
FIG. 6 is a graph illustrating an example of a relationship between the temperature and viscosity of hydraulic oil.

FIG. 6 is a graph illustrating an example of a relationship between the temperature of the hydraulic oil (oil temperature) and the viscosity of the hydraulic oil. When the temperature of the hydraulic oil is 0° C. or higher, the viscosity of the hydraulic oil decreases slowly with increasing temperature, facilitating flow of the hydraulic oil. When the temperature is lower than 0° C., the viscosity increases rapidly to degrade fluidity. An increased viscosity of the hydraulic oil increases rotational resistance to the hydraulic pump 51 to reduce the rotation speed of the electric motor 52 even though a constant motor current is supplied to the electric motor 52. In contrast, a reduced velocity of the hydraulic oil decreases the rotational resistance to the hydraulic pump 51 to increase the rotation speed of the electric motor 52.

Therefore, when the control apparatus 10 pre-stores the relationship between the temperature of the hydraulic oil and a value resulting from division, by the rotation speed of the electric motor 52, of the current value of the motor current supplied to the electric motor 52, the temperature of the hydraulic oil can be estimated based on the motor current supplied to the electric motor 52 and the rotation speed of the electric motor 52. In the present embodiment, the control apparatus 10 pre-stores information on the relationship between the temperature of the hydraulic oil and a value obtained by dividing the current value of the motor current by the rotation speed, which is experimentally determined.

Figure 7:
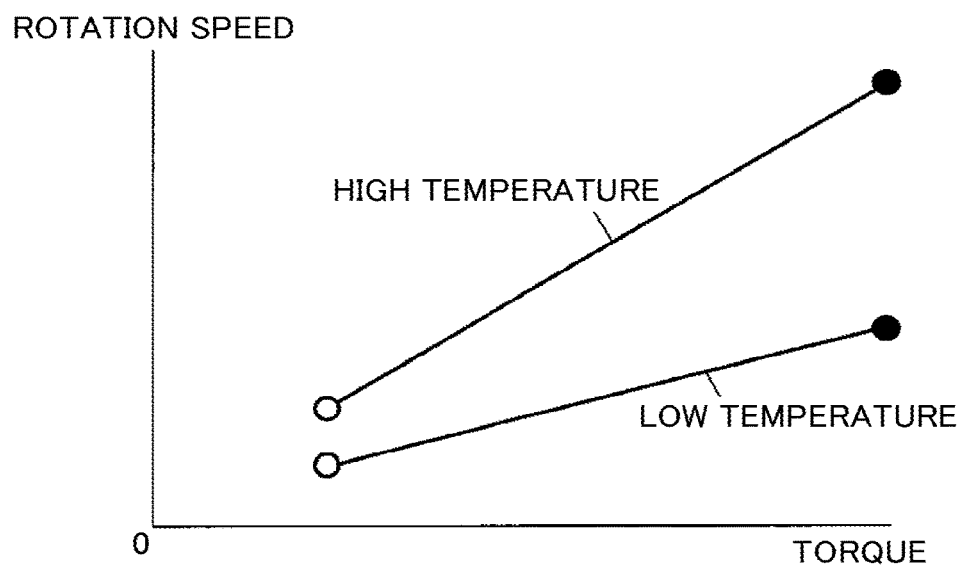
FIG. 7 is a graph illustrating an example of a relationship between the torque and rotation speed of an electric motor.

FIG. 7 is a graph illustrating an example of a relationship between the torque and rotation speed of the electric motor 52 observed when the torque transmitted by the first and second friction clutches 12A and 12B varies from a minimum value (two-wheel driving state) to a maximum value when the hydraulic oil has a high temperature (80° C.) and a low temperature (−20° C.). In FIG. 7, blank circles represent operating points of the electric motor 52 observed when the transmitted torque has the minimum value, and filled circles represent operating points of the electric motor 52 observed when the transmitted torque has the maximum value.

As depicted in FIG. 7, the electric motor 52 needs to be operated at a higher rotation speed and at a higher torque when the hydraulic oil has the high temperature than when the hydraulic oil has the low temperature. The target discharge pressure calculating apparatus 101 sets the target value for the discharge pressure of the hydraulic pump 51 taking the above-described characteristic into account.

Figure 8:
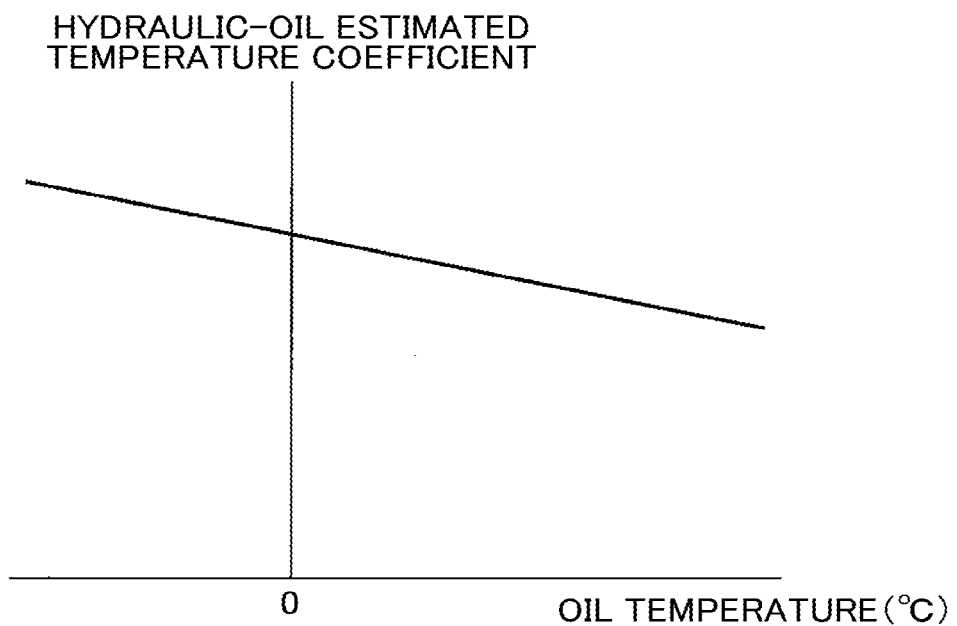
FIG. 8 is a graph illustrating an example of relationship information illustrating a relationship between the temperature of the hydraulic oil and a value resulting from division of a current value of the electric motor by the rotation speed of the electric motor.

FIG. 8 is a graph illustrating relationship information indicative of the relationship between the temperature of the hydraulic oil and the value resulting from the division, by the rotation speed, of the current value of the motor current supplied to the electric motor 52 (the ratio between the current value of the motor current and the rotation speed). The relationship information is experimentally determined and stored in the hydraulic-oil temperature estimating apparatus 105. With reference to the relationship information, the hydraulic-oil temperature estimating apparatus 105 estimates the temperature of the hydraulic oil. In the graph illustrated in FIG. 8, the axis of abscissas represents the temperature of the hydraulic oil (oil temperature), and the axis of ordinate represents the value resulting from the division of the current value of the electric motor 52 by the rotation speed of the electric motor 52.

The value resulting from the division, by the rotation speed, of the current value of the motor current supplied to the electric motor 52 is hereinafter referred to as a hydraulic-oil estimated temperature coefficient. The relationship information indicative of the relationship between the hydraulic-oil estimated temperature coefficient and the temperature of the hydraulic oil is hereinafter referred to as hydraulic-oil temperature relationship information.

As described above, an elevated temperature of the hydraulic oil reduces the viscosity of the hydraulic oil and thus the rotational resistance to the hydraulic pump. This increases the rotation speed while reducing the hydraulic-oil estimated temperature coefficient even when the motor current supplied to the electric motor 52 remains the same. On the other hand, a lowered temperature of the hydraulic oil increases the viscosity of the hydraulic oil and thus the rotational resistance to the hydraulic pump. This reduces the rotation speed while increasing the hydraulic-oil estimated temperature coefficient even when the motor current supplied to the electric motor 52 remains the same. Therefore, the temperature of the hydraulic oil can be estimated based on the hydraulic-oil estimated temperature coefficient.

In experiments for obtaining characteristics illustrated in FIG. 8, a predetermined motor current is supplied to the electric motor 52, and the rotation speed of the electric motor 52 and the temperature of the hydraulic oil are measured in a steady state where the temperature of the electric motor 52, the temperature of the hydraulic pump 51, and the temperature of the hydraulic oil are constant. The measurement is performed at a plurality of (for example, five or more) measurement points.

Figure 9:
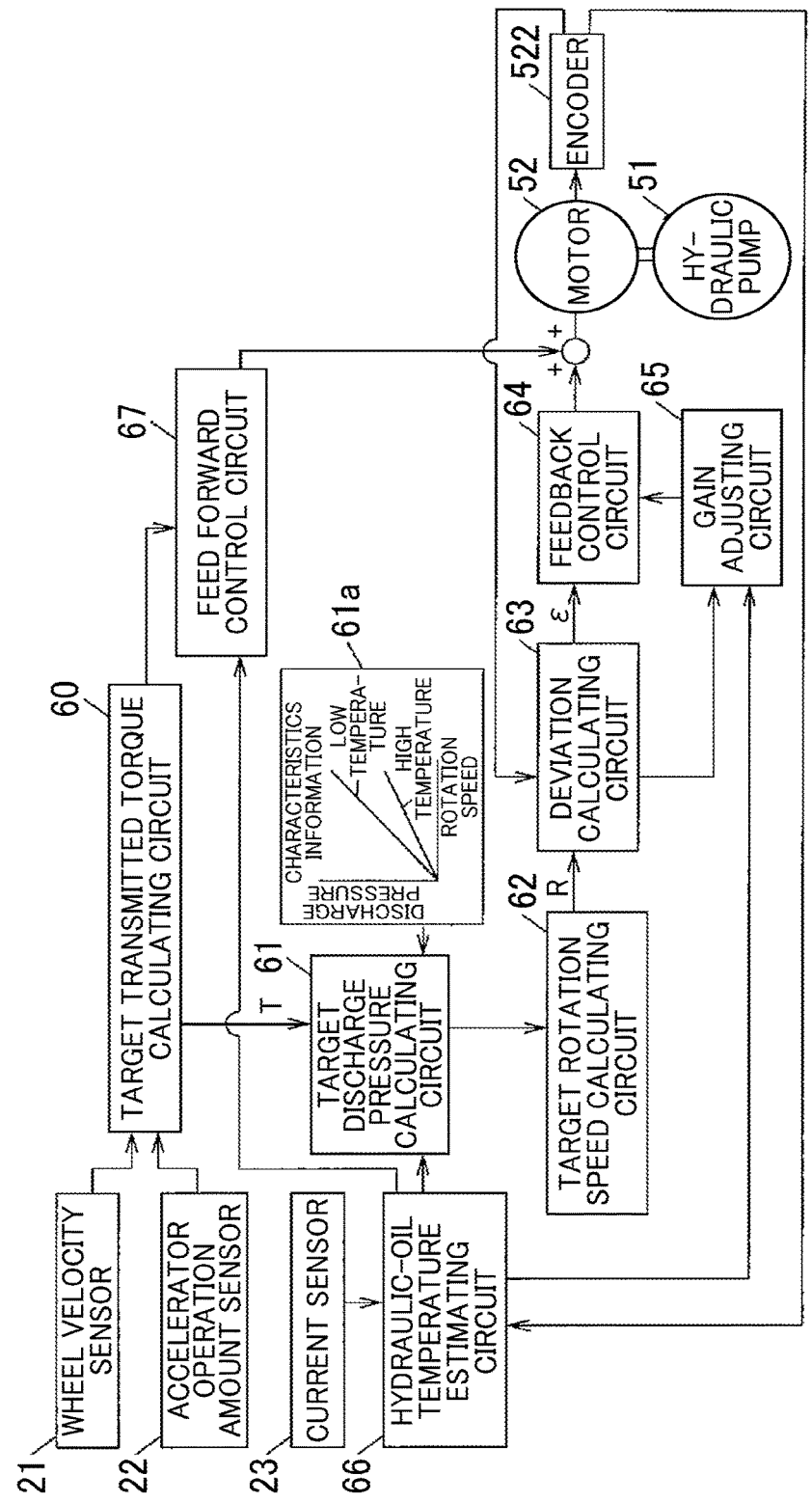
FIG. 9 is a control block diagram depicting a configuration example of a control system of the electric motor.

Now, with reference to FIG. 9, a method of control of the electric motor 52 in the driving-force transmitting apparatus 1 will be described, which is executed by the control apparatus 10. FIG. 9 is a control block diagram illustrating a configuration example of a control system for the electric motor 52.

The detection values from the wheel velocity sensor 21 and the accelerator operation amount sensor 22 are input to a target transmitted torque calculating circuit 60 implemented by the target torque calculating apparatus 100. The target transmitted torque calculating circuit 60 calculates a target value T of the transmitted torque such that the torque transmitted by the first and second friction clutches 12A and 12B increases in tandem with a front-and-rear-wheel rotation speed difference that is a difference in rotation speed between the pair of the front wheels 204R and 204L and the pair of the rear wheels 205R and 205L and with the accelerator operation amount.

A target discharge pressure calculating circuit 61 sets a target value of the discharge pressure of the hydraulic pump 51 based on the target value T of the transmitted torque calculated by the target transmitted torque calculating circuit 60 and the estimated temperature of the hydraulic oil. At this time, the target discharge pressure calculating circuit 61 references characteristics information 61a indicative of the relationship between the discharge pressure of the hydraulic pump 51 and both the rotation speed of the electric motor 52 and the temperature of the hydraulic oil. The function of the target discharge pressure calculating circuit 61 is implemented by the target discharge pressure calculating apparatus 101. In the present embodiment, the target discharge pressure calculating circuit 61 sets the target value of the discharge pressure of the hydraulic pump 51 so as to make the discharge pressure slightly higher than the hydraulic pressure of the hydraulic oil to be fed to the cylinder chambers 130d corresponding to the first and second friction clutches 12A and 12B.

A target rotation speed calculating circuit 62 calculates a target value R of the rotation speed of the electric motor 52 corresponding to the target value of the discharge pressure of the hydraulic pump 51 calculated by the target discharge pressure calculating circuit 61. A deviation calculating circuit 63 determines the rotation speed of the electric motor 52 based on pulse signals output from the encoder 522 to calculate a deviation ε that is a difference between the determined rotation speed of the electric motor 52 and the target value R of the rotation speed. Since the discharge pressure of the hydraulic pump 51 and the rotation speed of the electric motor 52 are in a proportional relationship as described above, the deviation ε represents the deviation between the target value and actual value of the discharge pressure of the hydraulic pump 51.

A feedback control circuit 64 feedback-controls the electric motor 52 based on the deviation ε calculated by the deviation calculating circuit 63. More specifically, the electric motor 52 is feedback-controlled by increasing and decreasing the voltage applied to the electric motor 52 so as to make the actual rotation speed of the electric motor 52 closer to the target value R of the rotation speed of the electric motor 52 set by the target rotation speed calculating circuit 62. The feedback control apparatus 102 implements the functions of the target rotation speed calculating circuit 62, the deviation calculating circuit 63, and the feedback control circuit 64.

In the present embodiment, as the feedback control, proportional integral derivative (PID) control is performed. The PID control is a type of feedback control in which a control target is controlled so as to make the actual value closer to the target value using three elements: the deviation between the target value and the actual value and an integral value and a derivative value of the deviation. In other words, the PID control involves simultaneously performing proportional-control based on the deviation between the target value and the actual value, integral-control based on the integral value of the deviation, and derivative-control based on the derivative value of the deviation.

A gain adjusting circuit 65 is implemented by the gain adjusting apparatus 103 to adjust the gain used for the PID control in the feedback control circuit 64 based on the temperature of the hydraulic oil (estimated temperature) estimated by a hydraulic-oil temperature estimating circuit 66 implemented by the hydraulic-oil temperature estimating apparatus 105. The gain includes a proportional gain for the proportional-control, an integral gain for the integral-control, and a derivative gain for the derivative-control. The gain adjusting circuit 65 reduces the proportional gain, the integral gain, and the derivative gain in keeping with increasing temperature of the hydraulic oil.

Figure 10:
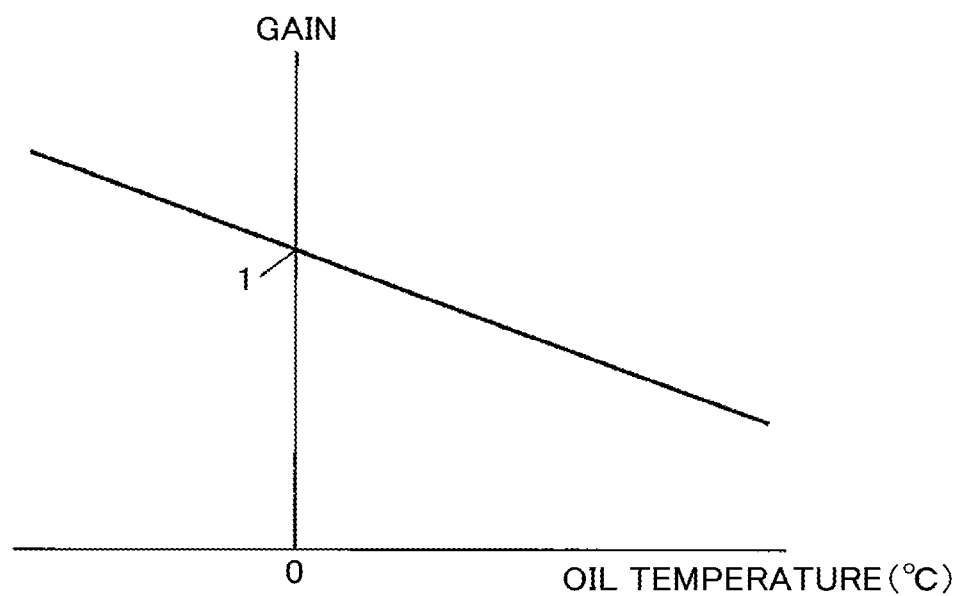
FIG. 10 is a graph illustrating an example of a relationship between the temperature of the hydraulic oil and a gain used for feedback control in a feedback control circuit.

FIG. 10 is a graph illustrating an example of a relationship between the temperature of the hydraulic oil and the gain used for the feedback control in the feedback control circuit 64. The graph illustrates a variation in gain with respect to the temperature of the hydraulic oil where the gain (the proportional gain, the integral gain, or the derivative gain) has a value of 1 (reference value) when the temperature of the hydraulic oil is 0° C. FIG. 10 illustrates an example where the gain varies in proportion to the temperature of the hydraulic oil. However, the invention is not limited to this. For example, the gain may be varied such that the amount of variation in gain with respect to the amount of variation in temperature of the hydraulic oil is larger in a lower temperature region. The gain adjusting circuit 65 stores information indicative of the relationship between the temperature of the hydraulic oil and the gain illustrated in FIG. 10, to adjust each gain with reference to the stored information. In the present embodiment, all of the proportional gain, the integral gain, and the derivative gain are adjusted in accordance with the temperature of the hydraulic oil. However, the invention is not limited to this. One or two of the proportional gain, the integral gain, and the derivative gain may be independently adjusted (for example, only the derivative gain or only the proportional gain and the derivative gain).

The hydraulic-oil temperature estimating circuit 66 calculates the rotation speed of the electric motor 52 based on an output signal from the encoder 522 and also calculates the current value of the motor current supplied to the electric motor 52 based on an output signal from the current sensor 23. The hydraulic-oil temperature estimating circuit 66 then estimates the temperature of the hydraulic oil based on the ratio between the calculated current value and the calculated rotation speed of the electric motor 52.

The feed forward control circuit 67 is implemented by the feed forward control apparatus 104 to calculate the voltage to be applied to the electric motor 52, for example, with reference to Table 1 described above, based on the target value T of the transmitted torque calculated by the target transmitted torque calculating circuit 60 and the temperature of the hydraulic oil estimated by the hydraulic-oil temperature estimating circuit 66. To the electric motor 52, a voltage is applied which results from addition of the correction amount calculated by the feedback control circuit 64 to the calculation result from the feed forward control circuit 67. The correction amount calculated by the feedback control circuit 64 increases in tandem with the deviation ε and with each gain.

The control apparatus 10 controls the first and second pressure control valves 531 and 532 based on the target value T of the transmitted torque calculated by the target transmitted torque calculating circuit 60. As described above, the target discharge pressure calculating circuit 61 calculates the target value R of the rotation speed of the electric motor 52 so as to make the discharge pressure of the hydraulic pump 51 higher than the hydraulic pressure of the hydraulic oil to be fed to the cylinder chambers 130d corresponding to the first and second friction clutches 12A and 12B. Thus, the first and second pressure control valves 531 and 532 reduce the discharge pressure of the hydraulic pump 51 and output the resultant pressure to the respective cylinder chambers 130d. Consequently, the hydraulic oil with the pressure corresponding to the target value T of the transmitted torque is fed to the cylinder chambers 130d corresponding to the first and second friction clutches 12A and 12B.

In the above-described present embodiment, the gain for the feedback control varies in accordance with the temperature of the hydraulic oil. That is, a lowered temperature and an increased viscosity of the hydraulic oil lead to an increased correction amount for the feedback control. Then, even with high rotational resistance to the hydraulic pump 51, the rotation speed of the electric motor 52 can be quickly made closer to the target value. On the other hand, an elevated temperature and a reduced viscosity of the hydraulic oil lead to a reduced correction amount for the feedback control. Consequently, possible overcontrol is suppressed which may oscilate the rotation speed of the electric motor 52. Thus, in the present embodiment, even with a change in the temperature of the hydraulic oil, the pressure at which the hydraulic oil is discharged from the hydraulic pump can be made closer to the target pressure.

Furthermore, in the present embodiment, the temperature of the hydraulic oil can be determined by estimation, eliminating the need for a temperature sensor that detects the temperature of the hydraulic oil. Costs of the apparatus can thus be reduced.

Now, a second embodiment of the invention will be described with reference to FIGS. 11 to 14. In the present embodiment, for improved control accuracy for the driving-force transmitting apparatus 1 according to the first embodiment, the temperature of the electric motor 52 is estimated, and the temperature of the hydraulic oil is estimated with the estimated temperature of the electric motor 52 taken into account. The remaining part of the configuration of the second embodiment is the same as the corresponding part of the configuration of the first embodiment. Thus, the following description focuses on differences from the first embodiment.

Figure 11:
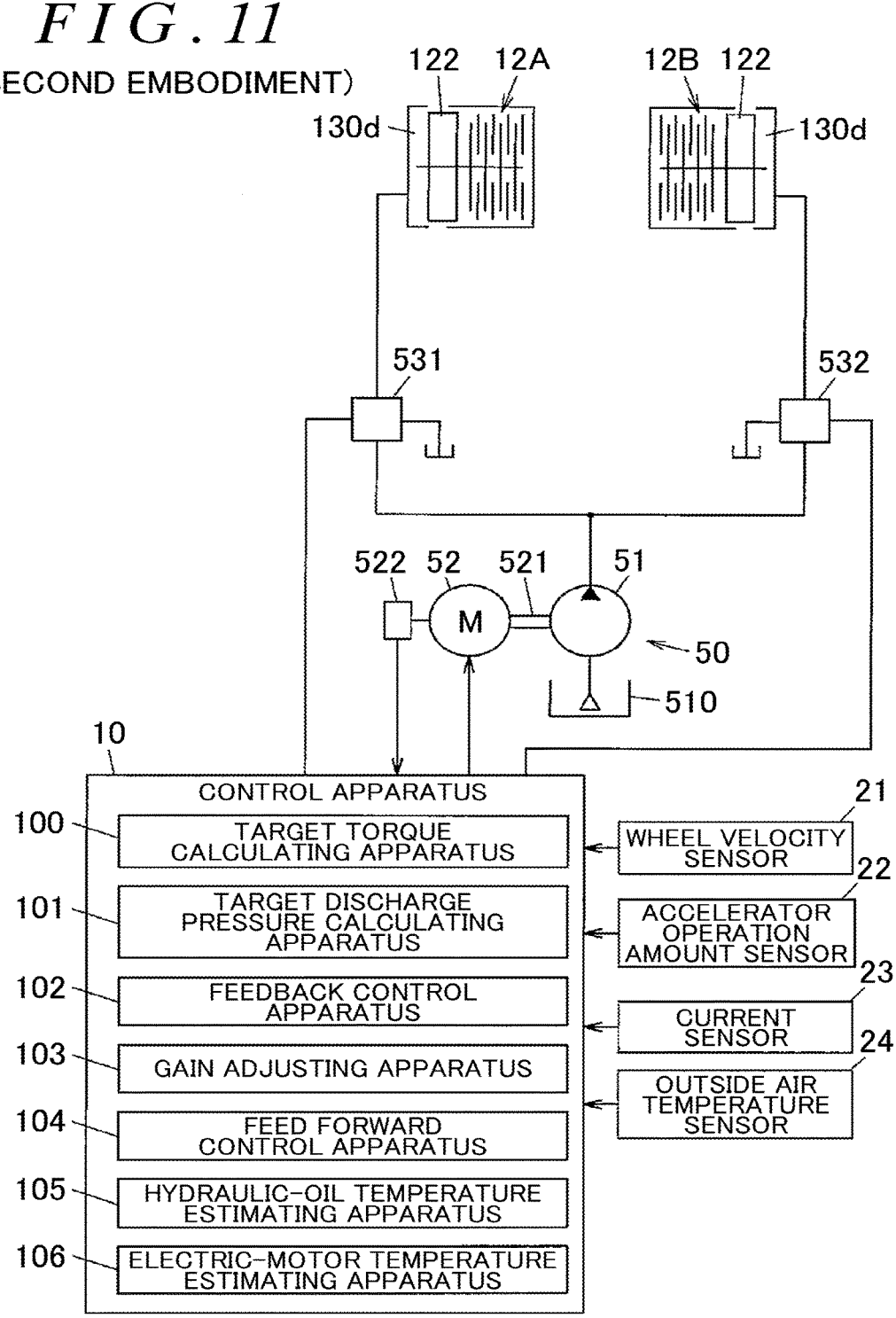
FIG. 11 is a diagram schematically illustrating a control apparatus according to a second embodiment and a configuration example of a hydraulic circuit.
Figure 12:
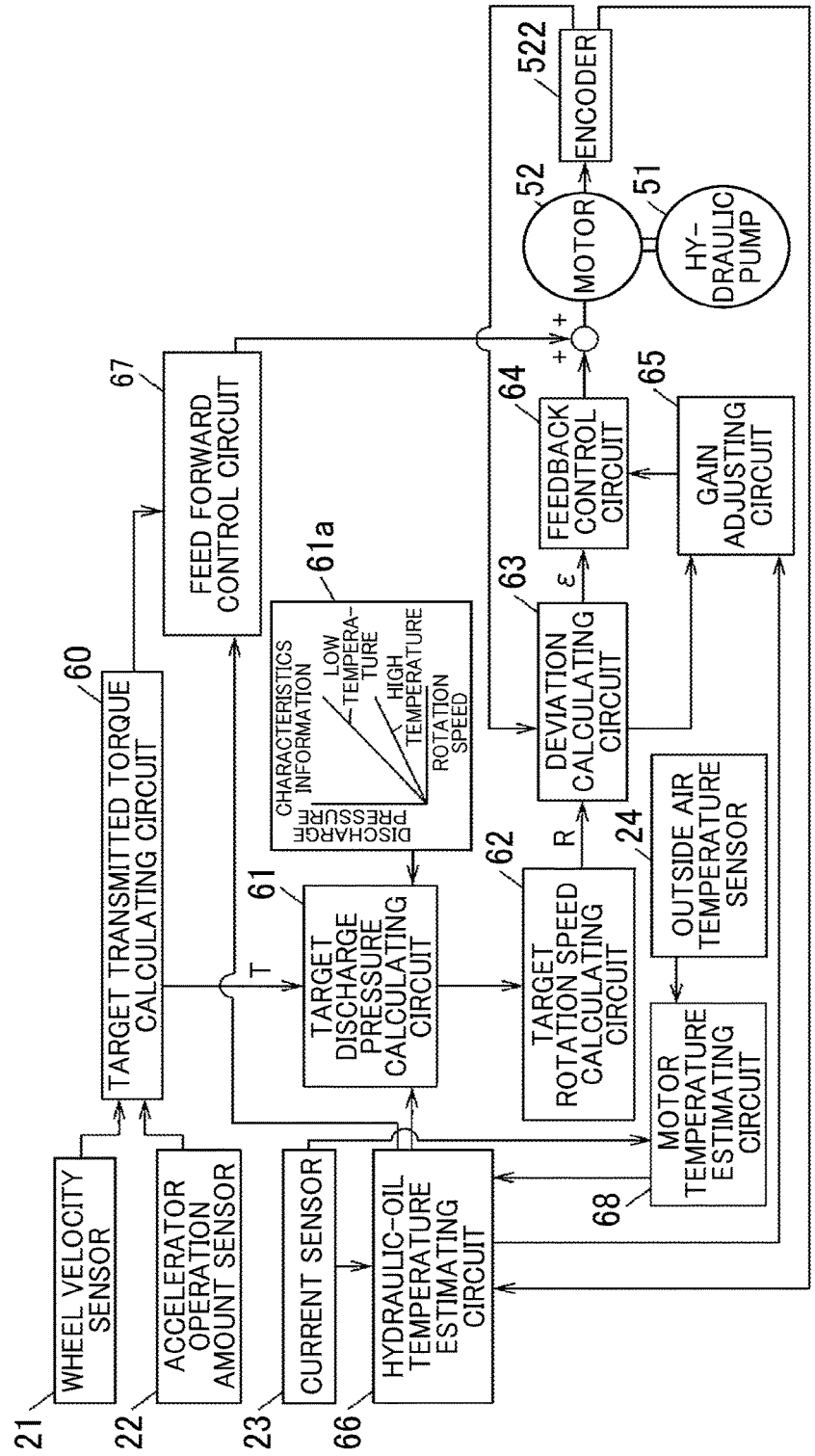
FIG. 12 is a control block diagram illustrating a configuration example of a control system for an electric motor according to the second embodiment.

FIG. 11 is a diagram illustrating the control apparatus 10 according to the present embodiment along with a configuration example of the hydraulic circuit 5. FIG. 12 is a control block diagram illustrating a configuration example of a control system for the electric motor 52 according to the present embodiment. As depicted in FIG. 11, the control apparatus 10 according to the present embodiment can acquire a result of measurement of an outside air temperature performed by an outside air temperature sensor 24.

An elevated temperature of the electric motor 52 increases electric resistance of windings of an excitation coil while reducing a magnetic force of a permanent magnet in the electric motor 52. When the permanent magnet in the electric motor 52 is a ferrite-based magnet, the magnetic force of the permanent magnet is reduced by approximately 0.2% when the temperature is elevated by 1° C. Therefore, when, for example, the temperature of the electric motor 52 (the temperature of the permanent magnet) changes from −20° C. to 80° C., an output torque from the electric motor 52 decreases by approximately 20% in spite of supply of a constant current to the windings in the electric motor 52.

The hydraulic-oil temperature relationship information described with reference to FIG. 8 in the first embodiment is set based on experimental results of measurement of the rotation speed of the electric motor 52 and the temperature of the hydraulic oil in a steady state where the temperature of the electric motor 52, the temperature of the hydraulic pump 51, and the temperature of the hydraulic oil are constant, as described above. Thus, when the electric motor 52 is controlled in this steady state, the temperature of the hydraulic oil is accurately estimated with a change in motor current-output toque characteristic attributed to the temperature of the electric motor 52 taken into account. However, if the motor current supplied to the electric motor 52 significantly increases in a short time, for example, as in the case where the vehicle traveling state switches from the two-wheel driving state to the four-wheel driving state, the temperature of the electric motor 52 elevates at a higher temperature rise rate than the temperature of the hydraulic oil, and the output torque decreases. This is because the amount of heat generated by the electric motor 52 increases in proportion to the square of the motor current and because the electric motor 52 has a smaller heat capacity than the hydraulic oil. As a result, the temperature of the hydraulic oil may fail to be accurately estimated, leading to reduced control accuracy.

In the present embodiment, the control apparatus 10 includes an electric-motor temperature estimating apparatus 106 that estimates the temperature of the electric motor 52 based on the current value of the motor current. The hydraulic-oil temperature estimating apparatus 105 estimates the temperature of the hydraulic oil taking into account the temperature of the electric motor 52 estimated by the electric-motor temperature estimating apparatus 106.

In a control block diagram in FIG. 12, a motor temperature estimating circuit 68 is implemented by the electric-motor temperature estimating apparatus 106 to estimate the temperature of the electric motor 52 based on the motor current of the electric motor 52 measured by the current sensor 23 and the outside air temperature measured by the outside air temperature sensor 24. The temperature of the electric motor 52 estimated by the motor temperature estimating circuit 68 is referenced by the hydraulic-oil temperature estimating circuit 66. A specific example of a calculation method for estimating the temperature of the electric motor 52 will be described below.

In the present embodiment, the hydraulic-oil temperature estimating apparatus 105 (hydraulic-oil temperature estimating circuit 66) estimates the temperature of the hydraulic oil with a predetermined calculation period. Then, when a difference of a predetermined value or larger is present between an estimated value of the temperature of the hydraulic oil obtained at the last estimation or before and the temperature of the electric motor 52 estimated by the electric-motor temperature estimating apparatus 106, the hydraulic-oil temperature estimating apparatus 105 determines a correction coefficient in accordance with the estimated temperature of the electric motor 52. Then, the hydraulic-oil temperature estimating apparatus 105 determines a ratio between the current value of the motor current and the rotation speed (hydraulic-oil estimated temperature coefficient) through application of the correction coefficient. Based on the hydraulic-oil estimated temperature coefficient, the hydraulic-oil temperature estimating apparatus 105 estimates the temperature of the hydraulic oil with reference to the hydraulic-oil temperature relationship information.

Figure 13:
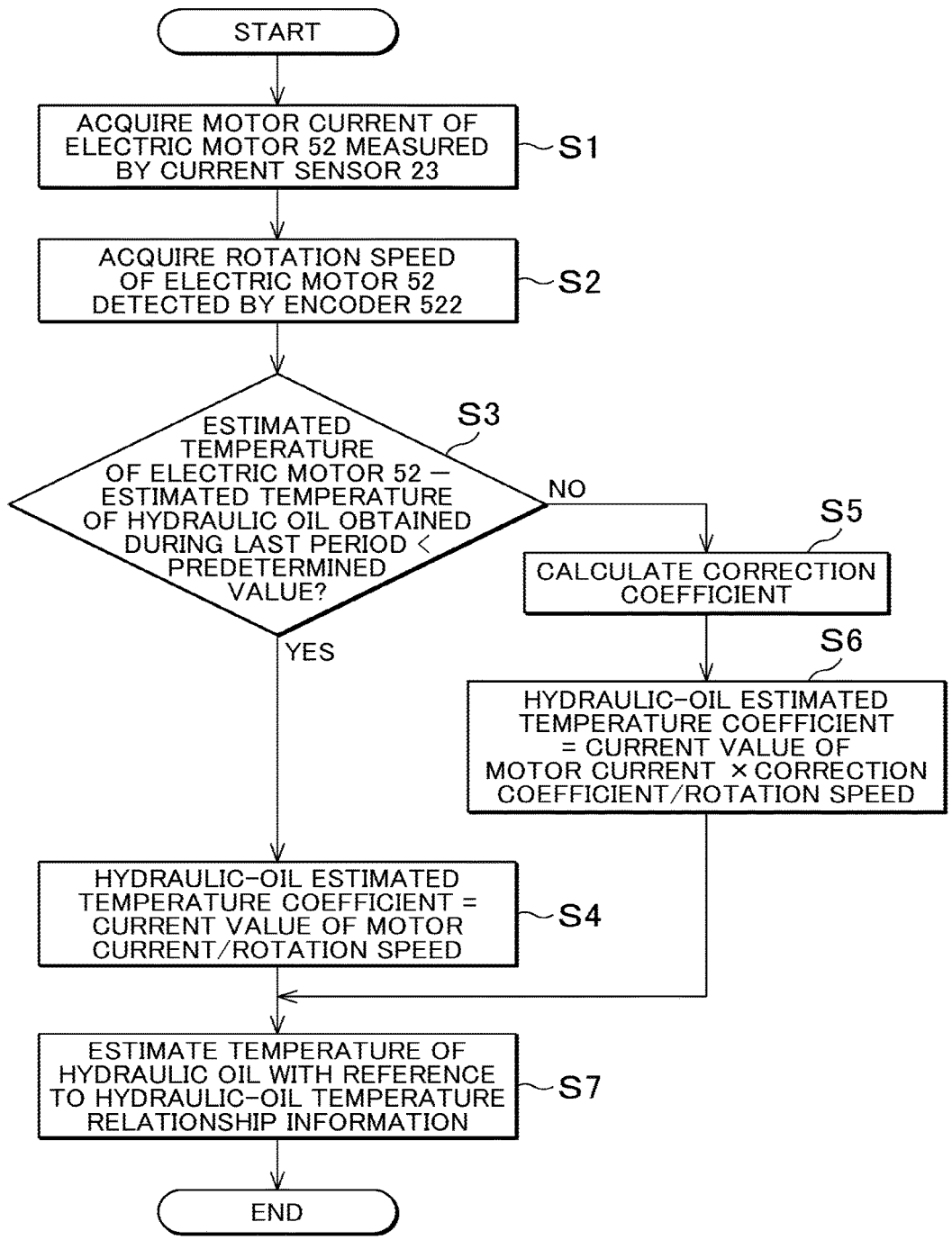
FIG. 13 is a flowchart illustrating a specific example of processing executed by a hydraulic-oil temperature estimating apparatus according to the second embodiment during one calculation period.

FIG. 13 is a flowchart illustrating a specific example of a process executed by the hydraulic-oil temperature estimating apparatus 105 during one calculation period. The calculation period is, for example, one second.

The hydraulic-oil temperature estimating apparatus 105 acquires the current value of the motor current of the electric motor 52 measured by the current sensor 23 and the rotation speed of the electric motor 52 detected by the encoder 522 (steps S1 and S2). Then, the hydraulic-oil temperature estimating apparatus 105 determines whether or not a value resulting from subtraction of the estimation result for the temperature of the hydraulic oil obtained during the last calculation period from the temperature of the electric motor 52 estimated by the electric-motor temperature estimating apparatus 106 is smaller than a predetermined value (for example, 10° C.) (step S3).

When a result of the determination indicates that the difference between the estimation result for the temperature of the hydraulic oil and the estimated temperature of the electric motor 52 is smaller than a predetermined value (step S3: Yes), the hydraulic-oil temperature estimating apparatus 105 divides the current value of the motor current of the electric motor 52 acquired in step S1 by the rotation speed of the electric motor 52 acquired in step S2 to determine the resultant value to be the hydraulic-oil estimated temperature coefficient (step S4). The hydraulic-oil temperature estimating apparatus 105 then estimates the temperature of the hydraulic oil with reference to the hydraulic-oil temperature relationship information (step S7).

When the result of the determination indicates that the difference between the estimation result for the temperature of the hydraulic oil and the estimated temperature of the electric motor 52 is equal to or larger than the predetermined value (step S3: No), the hydraulic-oil temperature estimating apparatus 105 determines the correction coefficient based on the temperature of the electric motor 52 estimated by the electric-motor temperature estimating apparatus 106 (step S5). The hydraulic-oil temperature estimating apparatus 105 multiplies the current value of the motor current acquired in step S1 by the correction coefficient, divides the product by the rotation speed of the electric motor 52, and then determines the resultant value to be the hydraulic-oil estimated temperature coefficient (step S6). The hydraulic-oil temperature estimating apparatus 105 then estimates the temperature of the hydraulic oil with reference to the hydraulic-oil temperature relationship information (step S7). A method for calculating the correction coefficient will be described below.

As described above, the hydraulic-oil temperature estimating apparatus 105 determines in step S3 whether or not the difference between the estimated temperature of the hydraulic oil obtained during the last calculation period and the temperature of the electric motor 52 estimated by the electric-motor temperature estimating apparatus 106 is smaller than the predetermined value. However, the invention is not limited to this. For example, the hydraulic-oil temperature estimating apparatus 105 may determine whether or not a difference between an average value of the estimated temperatures of the hydraulic oil calculated over a plurality of calculation periods including a calculation period before the last calculation period and the temperature of the electric motor 52 estimated by the electric-motor temperature estimating apparatus 106 is smaller than the predetermined value.

Now, a specific example of arithmetic estimation of the temperature of the electric motor 52 performed by the electric-motor temperature estimating apparatus 106 (motor temperature estimating circuit 68) will be described. The electric-motor temperature estimating apparatus 106, for example, arithmetically estimates the temperature of the electric motor 52, with the same calculation period as that for the estimation of the temperature of the hydraulic oil performed by the hydraulic-oil temperature estimating apparatus 105.

When the estimation result for the temperature of the electric motor 52 obtained during the last calculation period is denoted as Tpre and the amount of change in temperature of the electric motor 52 after a point in time for the last calculation, the estimated temperature Tcur of the electric motor 52 obtained during the current calculation period is determined in accordance with Expression (1).

$$Tcur = Tpre + \Delta Tpre \quad (1)$$

The amount of change in temperature of the electric motor 52 ($\Delta Tpre$) can be determined by subtracting a decrease in temperature caused by heat dissipation from an increase in temperature attributed to the motor current and multiplying the resultant value by the reciprocal of the heat capacity of the electric motor 52. The increase in temperature can be determined in accordance with the product of the square of the motor current supplied to the electric motor 52 and a resistance value for the windings in the electric motor 52. The decrease in temperature can be determined by subtracting the outside air temperature from Tpre, which is the estimation result for the temperature of the electric motor 52 obtained during the last calculation period, and multiplying the resultant value by a predetermined coefficient of heat transfer. The coefficient of heat transfer is related to heat dissipation from the electric motor 52 to the outside air and can be determined, for example, by experiment.

Therefore, when the increase in temperature of the electric motor 52 is denoted as Q, the heat capacity of the electric motor 52 is denoted as C, the coefficient of heat transfer is denoted by $\lambda$, and the outside air temperature is denoted as Tamb, the estimated temperature Tour of the electric motor 52 is determined in accordance with Expression (2).

$$Tcur = Tpre + \frac{1}{C}\{Q - \lambda(Tpre - Tamb)\} \quad (2)$$

Now, a specific example of a method for calculating the correction coefficient when the difference between the estimation result for the temperature of the hydraulic oil and the estimated temperature of the electric motor 52 is equal to or larger than the predetermined value will be described with reference to FIG. 14.

Figure 14:
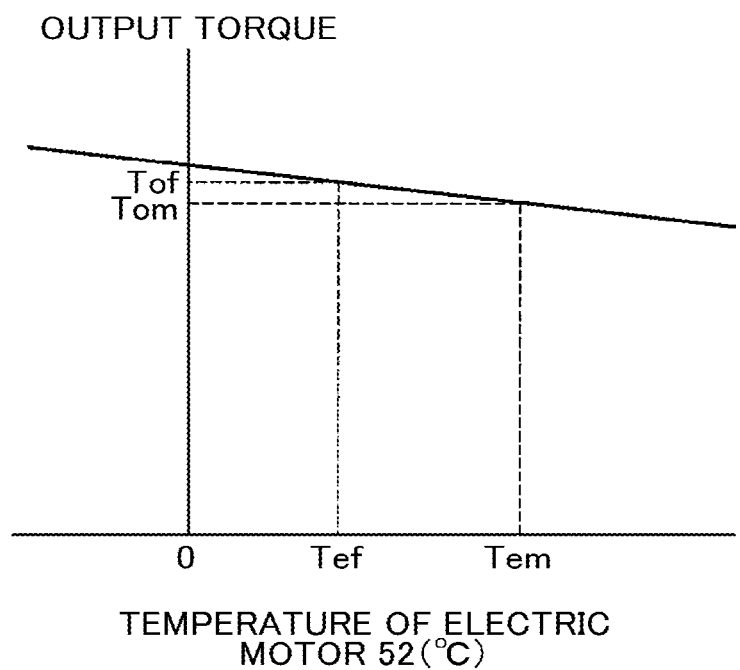
FIG. 14 is a graph illustrating a relationship between the temperature and output torque of an electric motor obtained when a motor current is constant.

FIG. 14 is a graph illustrating a relationship between the temperature of the electric motor 52 and the output torque of the electric motor 52 observed when the motor current is constant. In the graph, the axis of abscissas represents the temperature of the electric motor 52, and the axis of ordinate represents the output torque of the electric motor 52. In the illustrated example, the output torque of the electric motor 52 varies in proportion to the temperature of the electric motor 52.

The electric-motor temperature estimating apparatus 106 stores characteristics information indicative of the relationship between the temperature and output torque of the electric motor 52, for example, for a plurality of current values of the motor current. The electric-motor temperature estimating apparatus 106 calculates the correction coefficient with reference to a piece of the characteristics information that is closest to the measured value of the motor current measured by the current sensor 23.

On the axis of abscissas in FIG. 14, the estimated temperature of the hydraulic oil calculated by the hydraulic-oil temperature estimating apparatus 105 is denoted by Tef, and the estimated temperature of the electric motor 52 calculated by the electric-motor temperature estimating apparatus 106 is denoted by Tem. As Tem, the estimated temperature Tcur of the electric motor 52 estimated by the electric-motor temperature estimating apparatus 106 during the latest calculation period is used. The correction coefficient is calculated by dividing a value (Tom) on the axis of ordinate corresponding to Tem by a value (Tof) on the axis of ordinate corresponding to Tef (Tom/Tof). The hydraulic-oil estimated temperature coefficient is a quotient determined by multiplying the current value of the motor current supplied to the electric motor 52 by the correction coefficient (=Tom/Tof) and dividing the product by the rotation speed of the electric motor 52.

The present embodiment not only produces the same effects as those described in the first embodiment but also allows the temperature of the hydraulic oil to be more accurately estimated to improve control accuracy by estimating the temperature of the electric motor 52 and estimating the temperature of the hydraulic oil taking the estimated temperature of the electric motor 52 into account.

Now, a third embodiment of the invention will be described with reference to FIG. 15. In the present embodiment, the temperature of the hydraulic oil is estimated with the estimated temperature of the electric motor 52 taken into account as in the second embodiment. However, a specific technique used for the present embodiment is different from the specific technique used for the second embodiment. The remaining part of the configuration of the present embodiment is the same as the corresponding part of the configuration of the second embodiment. Thus, the following description focuses on differences from the second embodiment.

In the above-described first and second embodiments, the hydraulic-oil temperature estimating apparatus 105 stores one piece of the hydraulic-oil temperature relationship information that is indicative of the relationship between the hydraulic-oil estimated temperature coefficient and the temperature of the hydraulic oil. However, in the present embodiment, the hydraulic-oil temperature estimating apparatus 105 stores a plurality of pieces of the hydraulic-oil temperature relationship information that corresponds to the difference between the estimated temperature of the hydraulic oil and the estimated temperature of the electric motor 52 (the difference is hereinafter referred to as the estimated temperature difference), and estimates the temperature of the hydraulic oil with reference to one piece of the hydraulic-oil temperature relationship information selected from the plurality of pieces of the hydraulic-oil temperature relationship information. The estimated temperature difference as used herein refers to a value resulting from subtraction of the estimated temperature of the hydraulic oil from the estimated temperature of the electric motor 52. The electric-motor temperature estimating apparatus 106 arithmetically estimates the temperature of the electric motor 52 with a predetermined calculation period as is the case with the second embodiment.

Figure 15:
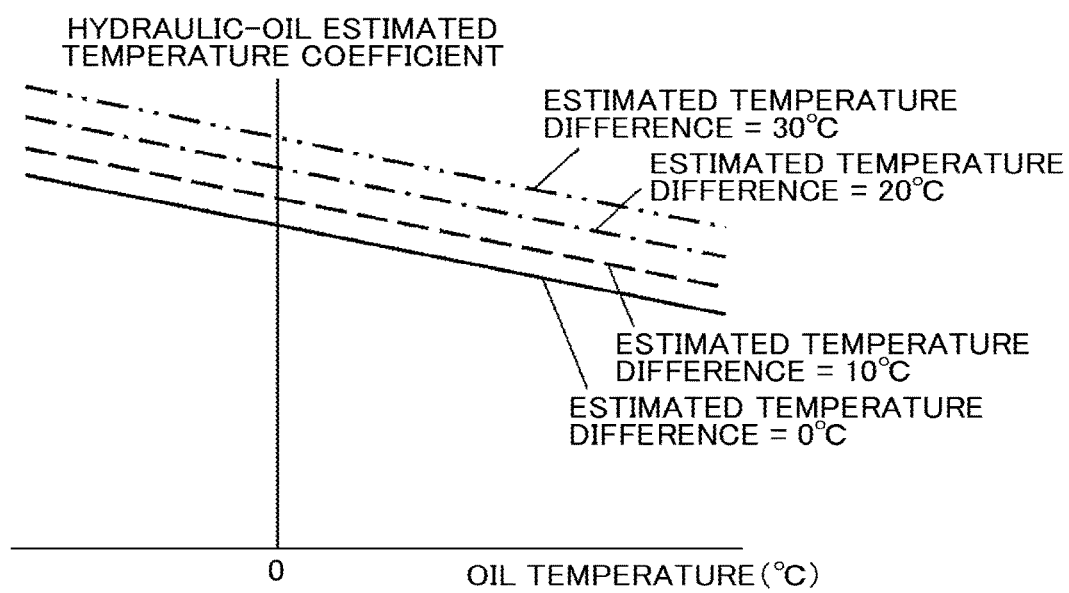
FIG. 15 is a graph illustrating an example of a plurality of pieces of hydraulic-oil temperature relationship information stored in a hydraulic-oil temperature estimating apparatus according to a third embodiment.

FIG. 15 is a graph illustrating an example of a plurality of pieces of the hydraulic-oil temperature relationship information stored in the hydraulic-oil temperature estimating apparatus 105 according to the present embodiment. In FIG. 15, a continuous line represents a piece of the hydraulic-oil temperature relationship information for an estimated temperature difference of 0° C., a dashed line represents a piece of the hydraulic-oil temperature relationship information for an estimated temperature difference of 10° C., a long dashed short dashed line represents a piece of the hydraulic-oil temperature relationship information for an estimated temperature difference of 20° C., and a long dashed double-short dashed line represents a piece of the hydraulic-oil temperature relationship information for an estimated temperature difference of 30° C. The plurality of pieces of the hydraulic-oil temperature relationship information can be determined through experiments conducted with the difference in temperature between the hydraulic oil and the electric motor 52 adjusted.

The graph in FIG. 15, the piece of the hydraulic-oil temperature relationship information represented by the continuous line is reference relationship information that is the same as the hydraulic-oil temperature relationship information described in the first embodiment with reference to FIG. 8 and that is indicative of the relationship between the hydraulic-oil estimated temperature coefficient and the temperature of the hydraulic oil observed when the temperature of the hydraulic oil is the same as the temperature of the electric motor 52. The hydraulic-oil temperature estimating apparatus 105 estimates the temperature of the hydraulic oil with a predetermined calculation period, and estimates the temperature of the hydraulic oil with reference to reference relationship information when the difference between the estimated value of the temperature of the hydraulic oil obtained at the last calculation period or before and the temperature of the electric motor 52 estimated by the electric-motor temperature estimating apparatus 106 is smaller than a predetermined value. When the difference between the estimated value of the temperature of the hydraulic oil obtained at the last calculation period or before and the temperature of the electric motor 52 estimated by the electric-motor temperature estimating apparatus 106 is equal to or larger than the predetermined value, the hydraulic-oil temperature estimating apparatus 105 selects one of the plurality of pieces of the hydraulic-oil temperature relationship information other than the reference relationship information that corresponds to the difference. The hydraulic-oil temperature estimating apparatus 105 then estimates the temperature of the hydraulic oil with reference to the selected piece of the hydraulic-oil temperature relationship information.

In the present embodiment, the hydraulic-oil temperature estimating apparatus 105 compares the estimated value of the temperature of the hydraulic oil obtained during the last calculation period with the temperature of the electric motor 52 estimated by the electric-motor temperature estimating apparatus 106. However, the invention is not limited to this. For example, the estimated temperature difference may be determined by comparing the average value of the estimated temperatures of the hydraulic oil calculated over a plurality of calculation periods including a calculation period before the last calculation period with the temperature of the electric motor 52 estimated by the electric-motor temperature estimating apparatus 106.

The hydraulic-oil temperature estimating apparatus 105 selects one of the plurality of pieces of the hydraulic-oil temperature relationship information to which the calculated estimated temperature difference is closest. For example, when the estimated temperature difference is 15° C. or higher and lower than 25° C., the piece of the hydraulic-oil temperature relationship information represented by the long dashed short dashed line is selected. The hydraulic-oil temperature estimating apparatus 105 may store the plurality of pieces of the hydraulic-oil temperature relationship information, for example, in a table form. In this case, the selected one piece of the hydraulic-oil temperature relationship information is looked up in the table to estimate the temperature of the hydraulic oil.

The present embodiment produces effects similar to the effects of the second embodiment.

The clutch apparatus according to the invention is applicable not only to the four-wheel drive vehicle 200 but also to various pieces of equipment.

What is claimed is:

1. A clutch apparatus comprising:
a friction clutch that is subjected to a pressing force to generate a friction force between friction members;
a piston that is subjected to a hydraulic pressure to press the friction clutch;
a hydraulic chamber in which the hydraulic pressure is allowed to act on the piston;
a hydraulic pump that feeds hydraulic oil to the hydraulic chamber;
an electric motor that drives the hydraulic pump; and
a control apparatus that controls the electric motor to adjust a discharge pressure of the hydraulic pump, wherein,
the control apparatus includes:
a feedback control apparatus that feedback-controls the electric motor using a correction value based on a deviation between a target value and an actual value of the discharge pressure of the hydraulic pump such that the discharge pressure of the hydraulic pump is equal to a target pressure;
a hydraulic-oil temperature estimating apparatus that estimates a temperature of the hydraulic oil based on a ratio between a current value of a motor current supplied to the electric motor and a rotation speed of the electric motor; and
a correction amount adjusting apparatus that changes a correction amount provided by the feedback control in accordance with the estimated temperature of the hydraulic oil,
wherein the clutch apparatus is free of a temperature sensor which detects the temperature of the hydraulic oil.

2. The clutch apparatus according to claim 1, wherein the control apparatus has an electric-motor temperature estimating apparatus that estimates a temperature of the electric motor based on the current value of the motor current, and
the hydraulic-oil temperature estimating apparatus estimates the temperature of the hydraulic oil taking the estimated temperature of the electric motor into account.

3. The clutch apparatus according to claim 2, wherein the hydraulic-oil temperature estimating apparatus stores relationship information indicative of a relationship between the ratio and the temperature of the hydraulic oil to estimate the temperature of the hydraulic oil with reference to the relationship information.

4. The clutch apparatus according to claim 3, wherein the hydraulic-oil temperature estimating apparatus estimates the temperature of the hydraulic oil with a predetermined period, and
determines a correction coefficient in accordance with the estimated temperature of the electric motor and estimates the temperature of the hydraulic oil with reference to the relationship information based on the ratio determined through application of the correction coefficient when a difference between an estimated value of the temperature of the hydraulic oil obtained during a period before a last period and the temperature of the electric motor estimated by the electric-motor temperature estimating apparatus is equal to or larger than a predetermined value.

5. The clutch apparatus according to claim 2, wherein the hydraulic-oil temperature estimating apparatus stores a plurality of pieces of relationship information indicative of a relationship between the ratio and the temperature of the hydraulic oil in accordance with an estimated temperature difference between the estimated temperature of the hydraulic oil and the estimated temperature of the electric motor, and
selects one of the plurality of pieces of the relationship information to estimate the temperature of the hydraulic oil with reference to the selected piece of the relationship information.

6. The clutch apparatus according to claim 5, wherein one of the plurality of pieces of the relationship information is reference relationship information that is indicative of the relationship between the ratio and the temperature of the hydraulic oil when the temperature of the hydraulic oil is equal to the temperature of the electric motor, the hydraulic-oil temperature estimating apparatus estimates the temperature of the hydraulic oil with a predetermined period, estimates the temperature of the hydraulic oil with reference to the reference relationship information when the difference between an estimated value of the temperature of the hydraulic oil obtained at the last period or before and the temperature of the electric motor estimated by the electric-motor temperature estimating apparatus is smaller than the predetermined value, and selects the one of the plurality of pieces of the relationship information that corresponds to the difference when the difference is equal to or larger than the predetermined value.

7. The clutch apparatus according to claim 1, wherein
the control apparatus calculates a feed forward control amount for the electric motor based on a target value of a torque to be transmitted by the friction clutch and the temperature of the hydraulic oil.

8. The clutch apparatus according to claim 6, wherein
the control apparatus calculates a feed forward control amount for the electric motor based on a target value of a torque to be transmitted by the friction clutch and the temperature of the hydraulic oil.

9. A method for controlling a clutch apparatus including a friction clutch that is subjected to a pressing force to generate a friction force between friction members, a piston that is subjected to a hydraulic pressure to press the friction clutch, a hydraulic chamber in which the hydraulic pressure is allowed to act on the piston, a hydraulic pump that feeds hydraulic oil to the hydraulic chamber, and an electric motor that drives the hydraulic pump, the method comprising:

estimating a temperature of the hydraulic oil based on a ratio between a current value of a motor current supplied to the electric motor and a rotation speed of the electric motor;

feedback-controlling the electric motor using a correction value based on a deviation between a target value and an actual value of a discharge pressure of the hydraulic pump such that the discharge pressure of the hydraulic pump is equal to a target pressure; and adjusting a correction amount through changing the correction amount provided by the feedback control in accordance with the estimated temperature of the hydraulic oil, wherein the clutch apparatus is free of a temperature sensor which detects the temperature of the hydraulic oil.

10. The clutch apparatus according to claim 1, further comprising:

an encoder which outputs a plurality of pulse signals during one rotation of a rotator of the electric motor to detect the rotation speed of the electric motor; and a current sensor which measures the current value of the motor current supplied to the electric motor.

11. The method according to claim 9, wherein
the current value of a motor current supplied to the electric motor is measured using a current sensor, and
the rotation speed of the electric motor is detected using an encoder which outputs a plurality of pulse signals during one rotation of a rotator of the electric motor.

* * * * *